US012219535B2

United States Patent
Na et al.

(10) Patent No.: US 12,219,535 B2
(45) Date of Patent: Feb. 4, 2025

(54) METHOD AND DEVICE FOR REPEATEDLY TRANSMITTING MESSAGE IN M2M SYSTEM

(71) Applicants: Hyundai Motor Company, Seoul (KR); Kia Corporation, Seoul (KR)

(72) Inventors: Young Jin Na, Gyeonggi-do (KR); Min Byeong Lee, Gyeonggi-do (KR); Jae Seung Song, Seoul (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 295 days.

(21) Appl. No.: 17/295,257

(22) PCT Filed: Nov. 27, 2019

(86) PCT No.: PCT/KR2019/016438
§ 371 (c)(1),
(2) Date: May 19, 2021

(87) PCT Pub. No.: WO2020/111761
PCT Pub. Date: Jun. 4, 2020

(65) Prior Publication Data
US 2022/0015096 A1    Jan. 13, 2022

Related U.S. Application Data

(60) Provisional application No. 62/869,256, filed on Jul. 1, 2019, provisional application No. 62/846,257, filed
(Continued)

(51) Int. Cl.
*H04W 72/0446* (2023.01)
*H04L 1/08* (2006.01)
(Continued)

(52) U.S. Cl.
CPC .......... *H04W 72/0446* (2013.01); *H04L 1/08* (2013.01); *H04L 1/1607* (2013.01); *H04W 4/70* (2018.02)

(58) Field of Classification Search
CPC ...... H04W 72/0446; H04W 4/70; H04L 1/08; H04L 1/1607
See application file for complete search history.

(56) References Cited

U.S. PATENT DOCUMENTS 6,977,888 B1 * 12/2005 Frenger ................. H04L 1/1848
714/751
2011/0093568 A1    4/2011 Thomas
(Continued)

FOREIGN PATENT DOCUMENTS

| CN | 103931116 A | 7/2014 |
| CN | 104602180 A | 5/2015 |

(Continued)

OTHER PUBLICATIONS

"Report of SA4#50 meeting, v. 0.0.1", TSG-SA4#50 meeting, Aug. 18-22, 2008, Sophia Antipolis, France, Source: TSG-S4 Secretary, 53 pages.

*Primary Examiner* — Michael Thier
*Assistant Examiner* — Nevena Zecevic Sandhu
(74) *Attorney, Agent, or Firm* — Fox Rothschild LLP

(57) ABSTRACT

A message repetition transmission method and apparatus in an M2M system is provided. According to an embodiment, method includes: setting attribute information for message repetition transmission; configuring a first resource that comprises the attribute information and is applied to message repetition transmission; and performing message repetition transmission according to the configured first resource. The attribute information for message repetition transmission can include at least one of information (targetResource) designating a target resource of message repetition transmission and information (valueForRepetition) designating a transmission value that is a message repetition transmission target.

19 Claims, 16 Drawing Sheets

Related U.S. Application Data on May 10, 2019, provisional application No. 62/771,873, filed on Nov. 27, 2018, provisional application No. 62/771,910, filed on Nov. 27, 2018.

(51) Int. Cl.
*H04L 1/1607* (2023.01)
*H04W 4/70* (2018.01)

(56) References Cited

U.S. PATENT DOCUMENTS

| | | | |
|---|---|---|---|
| 2014/0369288 A1 | 12/2014 | Kim et al. | |
| 2015/0358111 A1* | 12/2015 | Marinier | H04W 72/23 370/329 |
| 2016/0302069 A1* | 10/2016 | Kim | H04L 9/32 |
| 2017/0295561 A1* | 10/2017 | Kim | H04L 27/2602 |
| 2019/0045333 A1* | 2/2019 | Serbetci | H04L 1/0011 |
| 2019/0124408 A1* | 4/2019 | Xiong | H04N 21/64322 |
| 2020/0146044 A1* | 5/2020 | Maaref | H04W 92/18 |

FOREIGN PATENT DOCUMENTS

| | | |
|---|---|---|
| CN | 106455062 A | 2/2017 |
| CN | 106851655 A | 6/2017 |
| EP | 3402164 A1 | 11/2018 |
| KR | 10-2004-0072961 A | 8/2004 |
| KR | 2014-0075707 A | 6/2014 |
| KR | 2016-0096985 A | 8/2016 |
| KR | 2017-0074861 A | 6/2017 |
| KR | 2018-0039651 A | 4/2018 |
| WO | 2016/068442 A1 | 5/2016 |
| WO | 2017/030485 A1 | 2/2017 |
| WO | 2017/160213 A1 | 9/2017 |

* cited by examiner

METHOD AND DEVICE FOR REPEATEDLY TRANSMITTING MESSAGE IN M2M SYSTEM

CROSS-REFERENCE TO RELATED APPLICATIONS

This application is a National Phase application filed under 35 USC 371 of PCT International Application No. PCT/KR2019/016438 with an International Filing Date of Nov. 27, 2019, which claims the benefit of U.S. Provisional Application 62/771,910 filed on Nov. 27, 2018; U.S. Provisional Application 62/771,873 filed on Nov. 27, 2018; U.S. Provisional Application 62/846,257 filed on May 10, 2019 and U.S. Provisional Application 62/869,256 filed on Jul. 1, 2019. The entire contents of these applications are incorporated herein by reference in their entirety.

TECHNICAL FIELD

The present invention relates to a machine-to-machine (M2M) system. More particularly, the present invention relates to a message repetition transmission method and apparatus in an M2M system. The present invention also relates to a message retransmission method and apparatus in an M2M system.

BACKGROUND ART

Recently, introduction of Machine-to-Machine (M2M) system has become active. M2M communication refers to a communication executed between machines without human intervention. M2M may refer to Machine Type Communication (MTC), Internet of Things (IoT) or Device-to-Device (D2D). In the following description, the term "M2M" is uniformly used for convenience of explanation, but the present invention is not limited thereto. A terminal used for M2M communication may be an M2M terminal or an M2M device. An M2M terminal may generally be a device having low mobility while transmitting a small amount of data. Herein, the M2M terminal may be used in connection with an M2M server that centrally stores and manages inter-machine communication information. In addition, an M2M terminal may be applied to various systems such as object tracking, automobile linkage, and power metering.

Meanwhile, with respect to an M2M terminal, the oneM2M standardization organization provides requirements for M2M communication, things to things communication and IoT technology, and technologies for architecture, Application Program Interface (API) specifications, security solutions and interoperability. The specifications of the oneM2M standardization organization provide a framework to support a variety of applications and services such as smart cities, smart grids, connected cars, home automation, security and health.

SUMMARY

The present invention may provide a message repetition transmission method and apparatus. The present invention may provide a message retransmission method and apparatus. The present invention may provide a message repetition transmission method and apparatus in an M2M system. The present invention may provide a method and apparatus for managing message repetition transmission by newly defining a message repetition resource in an M2M system. The present invention may provide a method and apparatus for managing message repetition transmission by newly defining message repetition transmission attribute information in an M2M system. The present invention may provide a method and apparatus for managing message retransmission by newly defining a message retransmission resource in an M2M system. The present invention may provide a method and apparatus for managing message retransmission by newly defining message retransmission attribute information in an M2M system.

According to an embodiment of the present invention, a message repetition transmission method includes setting attribute information for message repetition transmission, configuring a first resource that includes the set attribute information and is applied to message repetition transmission, and performing message repetition transmission according to the configured first resource. The attribute information for the message repetition transmission includes at least information (targetResource) designating a target resource of message repetition transmission and information (valueForRepetition) designating a transmission value that is a message repetition transmission target.

Additionally, in a message repetition transmission method according to an embodiment of the present invention, the attribute information for message repetition transmission includes information (repetitionOriginator) that designates an originator requesting message repetition transmission. In a message repetition transmission method according to an embodiment of the present invention, the attribute information for message repetition transmission includes information (targetOperation) that designates an operation method of message repetition transmission.

In addition, in a message repetition transmission method according to an embodiment of the present invention, the attribute information for message repetition transmission includes information (nextForcedvalue) designating a value that is applied to next message repetition transmission. In a message repetition transmission method according to an embodiment of the present invention, when the nextForcedvalue attribute information is updated in the first resource, next message repetition transmission may be performed with a value designated by the nextForcedvalue attribute instead of a transmission value designated by the valueForRepetition attribute.

Additionally, in a message repetition transmission method according to an embodiment of the present invention, the attribute information for message repetition transmission includes information (intervalRep) designating an interval at which a message repetition transmission operation is performed. In a message repetition transmission method according to an embodiment of the present invention, the attribute information for message repetition transmission includes information (repetitionDuration) designating a number of times a repetition transmission operation is performed.

In addition, in a message repetition transmission method according to an embodiment of the present invention, the attribute information for message repetition transmission includes information (responseMode) that designates a method of receiving a response message. In a message repetition transmission method according to an embodiment of the present invention, the first resource may be a repeated creation resource (msgRepetition). In a message repetition transmission method according to an embodiment of the present invention, the first resource may include a schedule resource as a child resource.

Additionally, in a message repetition transmission method according to an embodiment of the present invention, the first resource may be included under a message repetition transmission list (msgRepetitionList) resource that is a parent resource. In a message repetition transmission method according to an embodiment of the present invention, the first resource may be a subscription resource. In a message repetition transmission method according to an embodiment of the present invention, the first resource may be a group resource. In a message repetition transmission method according to an embodiment of the present invention, apart from the first resource, a second resource for managing message repetition transmission may be included, and the second resource may be any one of a subscription resource and a group resource.

In addition, according to an embodiment of the present invention, a message repetition transmission method includes receiving a request message, which requests message repetition transmission, configuring, in response to the request message, a first resource that includes attribute information for message repetition transmission and is applied to message repetition transmission, and according to the configured first resource, performing message repetition transmission. The attribute information for the message repetition transmission includes at least information (targetResource) designating a target resource of message repetition transmission and information (valueForRepetition) designating a transmission value that is a message repetition transmission target.

According to an embodiment of the present invention, a message retransmission method includes setting attribute information for message retransmission, configuring a first resource that includes the set attribute information and is applied to message retransmission, and according to the configured first resource, performing message retransmission. The attribute information for the message retransmission includes at least information (maxNrOfRetransmission) designating a maximum number of times retransmission is performed and information (memberNotDelivered) designating a member to which a retransmitted message is not delivered.

In addition, according to an embodiment of the present invention, a message retransmission method includes checking whether there is a failed node that fails to receive multicast transmission and performing, for the failed node, retransmission up to a maximum number of retransmission times according to the information (maxNrOfRetransmission) designating the maximum number of times the retransmission is performed. In a message retransmission method according to an embodiment of the present invention, the performing of message retransmission to the failed node may retransmit by a unicast transmission method. In a message retransmission method according to an embodiment of the present invention, the attribute information for message retransmission may include information (RetransmissionMode) that designates at least one of a unicast transmission method and an MBMS transmission method as a retransmission method.

According to an embodiment of the present invention, a message repetition transmission apparatus includes at least one or more processors and at least one or more memories coupled to the at least one or more processors. The at least one or more processors, which are operably coupled to the at least one or more memories and execute a program instruction stored in the at least one or more memories, set attribute information for message repetition transmission, configure a first resource that includes the set attribute information and is applied to message repetition transmission, and perform message repetition transmission according to the configured first resource. The attribute information for the message repetition transmission includes at least information (targetResource) designating a target resource of message repetition transmission and information (valueForRepetition) designating a transmission value that is a message repetition transmission target.

According to an embodiment of the present invention, a message repetition transmission apparatus includes at least one or more processors and at least one or more memories coupled to the at least one or more processors. The at least one or more processors, which are operably coupled to the at least one or more memories and execute a program instruction stored in the at least one or more memories, receive a request message that requests message repetition transmission, configure, in response to the request message, a first resource that includes attribute information for message repetition transmission and is applied to message repetition transmission, and perform message repetition transmission according to the configured first resource. The attribute information for the message repetition transmission includes at least information (targetResource) designating a target resource of message repetition transmission and information (valueForRepetition) designating a transmission value that is a message repetition transmission target.

Additionally, according to an embodiment of the present invention, a message retransmission apparatus includes at least one or more processors and at least one or more memories coupled to the at least one or more processors. The at least one or more processors, which are operably coupled to the at least one or more memories and execute a program instruction stored in the at least one or more memories, set attribute information for message retransmission, configure a first resource that includes the set attribute information and is applied to message retransmission, and perform message retransmission according to the configured first resource. The attribute information for the message retransmission includes at least information (maxNrOfRetransmission) designating a maximum number of times retransmission is performed and information (memberNotDelivered) designating a member to which a retransmitted message is not delivered.

According to the present invention, a method and apparatus for efficiently managing message repetition transmission may be provided. According to the present invention, a method and apparatus for efficiently managing message retransmission may be provided. According to the present invention, a method and apparatus for efficiently managing message repetition transmission in an M2M system may be provided.

According to the present invention, a method and apparatus for efficiently managing message retransmission in an M2M system may be provided. According to the present invention, through periodic message repetition transmission in an M2M system, it becomes possible to provide useful information a terminal that has newly joined a danger warning area. According to the present invention, through message retransmission in an M2M message, it becomes possible to provide an emergency warning message to every terminal existing in a danger warning area.

Effects obtained in the present invention are not limited to the above-mentioned effects, and other effects not mentioned above may be clearly understood by those skilled in the art from the following description.

DETAILED DESCRIPTION

Figure 1:
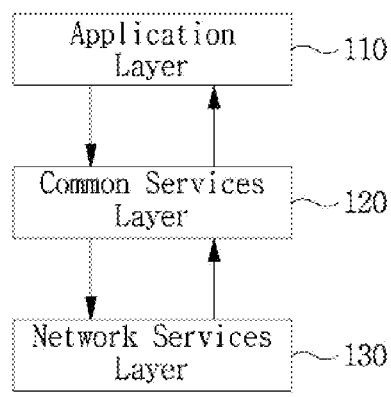
FIG. 1 is a view illustrating a layered structure of an M2M system according to the present invention.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the present disclosure, the terms first, second, etc. are used only for the purpose of distinguishing one component from another, and do not limit the order or importance of components, etc. unless specifically stated otherwise. Thus, within the scope of this disclosure, a first component in one exemplary embodiment may be referred to as a second component in another embodiment, and similarly a second component in one exemplary embodiment may be referred to as a first component.

In the present disclosure, when a component is referred to as being "linked", "coupled", or "connected" to another component, it is understood that not only a direct connection relationship but also an indirect connection relationship through an intermediate component may also be included. Also, when a component is referred to as "comprising" or "having" another component, it may mean further inclusion of another component not the exclusion thereof, unless explicitly described to the contrary.

In the present disclosure, components that are distinguished from each other are intended to clearly illustrate each feature. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

In the present disclosure, components described in the various embodiments are not necessarily essential components, and some may be optional components. Accordingly, embodiments consisting of a subset of the components described in one embodiment are also included within the scope of the present disclosure. Also, exemplary embodiments that include other components in addition to the components described in the various embodiments are also included in the scope of the present disclosure.

In the following description of the exemplary embodiments of the present disclosure, a detailed description of known functions and configurations incorporated herein will be omitted when it may make the subject matter of the present disclosure rather unclear. Parts not related to the description of the present disclosure in the drawings are omitted, and like parts are denoted by similar reference numerals.

In addition, the present specification describes a network based on Machine-to-Machine (M2M) communication, and a work in M2M communication network may be performed in a process of network control and data transmission in a system managing the communication network.

In addition, in the present specification, an M2M terminal may be a terminal performing M2M communication. However, in consideration of backward compatibility, it may be a terminal operating in a wireless communication system. In other words, an M2M terminal may refer to a terminal operating based on M2M communication network but is not limited thereto. An M2M terminal may operate based on another wireless communication network and is not limited to the embodiment described above.

In addition, an M2M terminal may be fixed or have mobility. In addition, an M2M server refers to a server for M2M communication and may be a fixed station or a mobile station. In addition, in the present specification, an entity may refer to hardware like M2M device, M2M gateway and M2M server. In addition, for example, an entity may be used to refer to software configuration in a layered structure of M2M system and is not limited to the embodiment described above.

In addition, for example, the present invention mainly describes an M2M system but is not solely applied thereto. In addition, an M2M server may be configured to perform communication with an M2M terminal or another M2M server. In addition, an M2M gateway may be a connection point between an M2M terminal and an M2M server. For example, when an M2M terminal and an M2M server have different networks, the M2M terminal and the M2M server may be connected to each other via an M2M gateway. Herein, for example, both an M2M gateway and an M2M server may be M2M terminals and are not limited to the exemplary embodiment described above.

FIG. 1 is a view illustrating a layered structure of an M2M system. Referring to FIG. 1, a layered structure of an M2M system may include an application layer 110, a common services layer 120 and a network services layer 130. Herein, the application layer 110 may be a layer that operates based on a specific application. For example, an application may be a fleet tracking application, a remote blood sugar monitoring application, a power metering application or a controlling application. In other words, an application layer may be a layer for a specific application. Herein, an entity operating based on an application layer may be an application entity (AE).

The common services layer 120 may be a layer for a common service function (CSF). For example, the common services layer 120 may be a layer configured to provide common services like data management, device management, M2M service subscription management and location service. For example, an entity operating based on the common services layer 120 may be a common service entity (CSE). The network services layer 130 may provide the common services layer 120 with services such as device management, location service and device triggering. Herein, an entity operating based on the network services layer 130 may be a network service entity (NSE).

Figure 2:
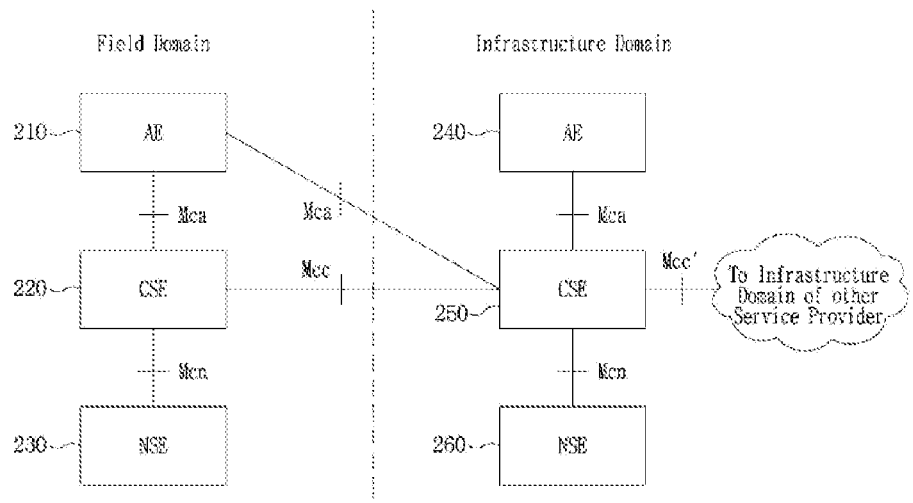
FIG. 2 is a view illustrating a reference point according to the present invention.

FIG. 2 is a view illustrating an M2M system structure. Referring to FIG. 2, an M2M system structure may be distinguished into a field domain and an infrastructure domain. Herein, in each domain, each of the entities may be configured to perform communication through a reference point. For example, a reference point may indicate a communication flow between each entity. Herein, referring to FIG. 2, the reference point Mca between AE and CSE, the reference point Mcc between different CSEs and the Mcn reference point between CSE and NSE may be set.

Figure 3:
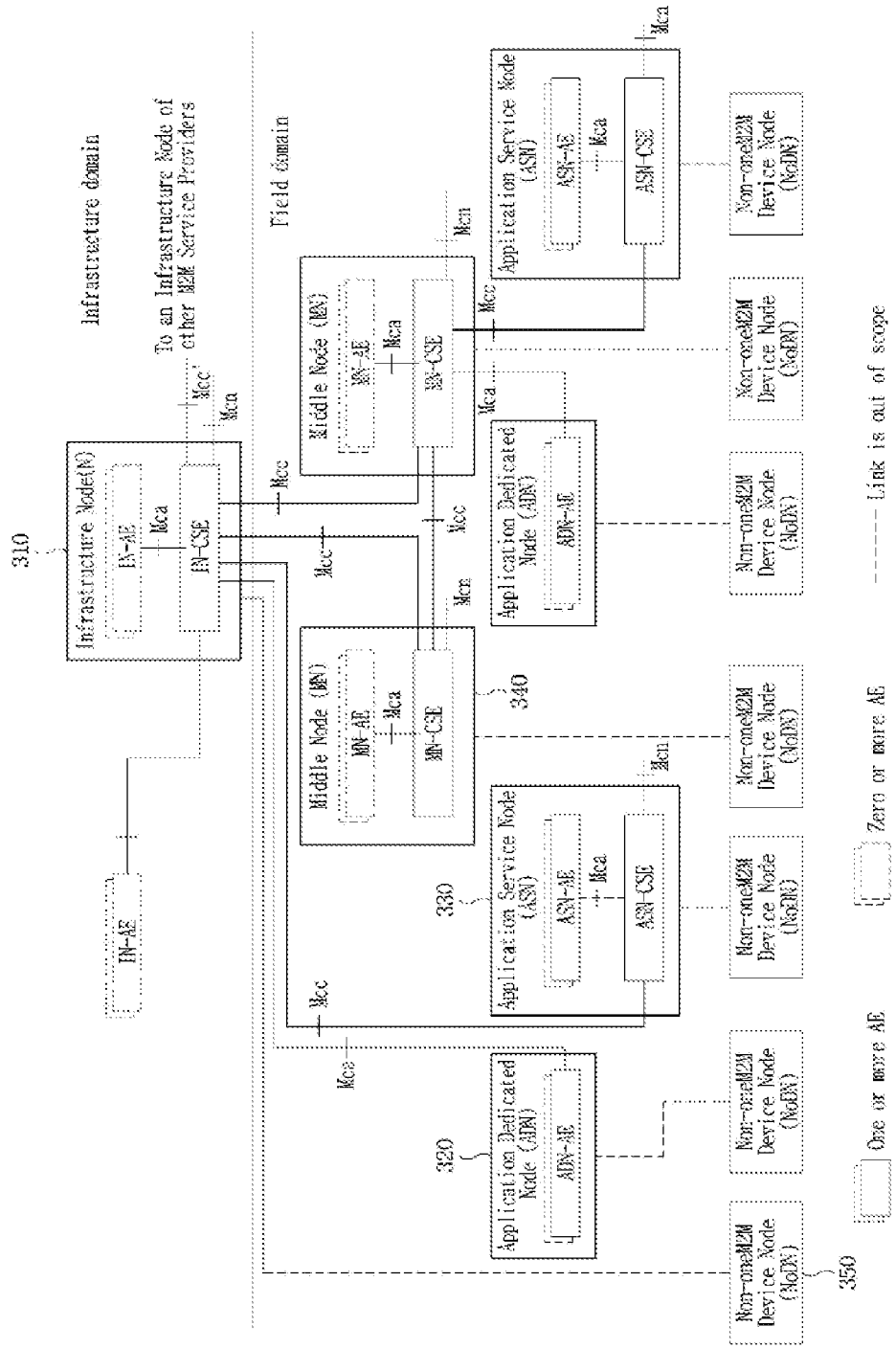
FIG. 3 is a view illustrating each node according to the present invention.

FIG. 3 is a view illustrating the setting of an M2M system structure. Referring to FIG. 3, an infrastructure domain of a specific M2M service provider may provide a specific infrastructure node (IN) 310. Herein, the CSE of the IN may be configured to perform communication based on the AE and the reference point Mca of another infrastructure node. In particular, one IN may be set for each M2M service provider. In other words, the IN may be a node configured to perform communication with the M2M terminal of another infrastructure based on an infrastructure structure. In addition, for example, conceptually, a node may be a logical entity or a software configuration.

Furthermore, an application dedicated node (ADN) 320 may be a node including at least one AE but not CSE. Herein, an ADN may be set in the field domain. In other words, an ADN may be a dedicated node for AE. For example, an ADN may be a node that is set in an M2M terminal in hardware. In addition, an application service node (ASN) 330 may be a node including one CSE and at least one AE. ASN may be set in the field domain. In other words, it may be a node including AE and CSE. Herein, an ASN may be a node connected to an IN. For example, an ASN may be a node that is set in an M2M terminal in hardware.

In addition, a middle node (MN) 340 may be a node including a CSE and including zero or more AEs Herein, the MN may be set in the field domain. An MN may be connected to another MN or IN based on a reference point. In addition, for example, an MN may be set in an M2M gateway in hardware. In addition, as an example, a non-M2M terminal node 350 (Non-M2M device node, NoDN) is a node that does not include M2M entities. It may be a node that performs management or collaboration together with an M2M system.

Figure 4:
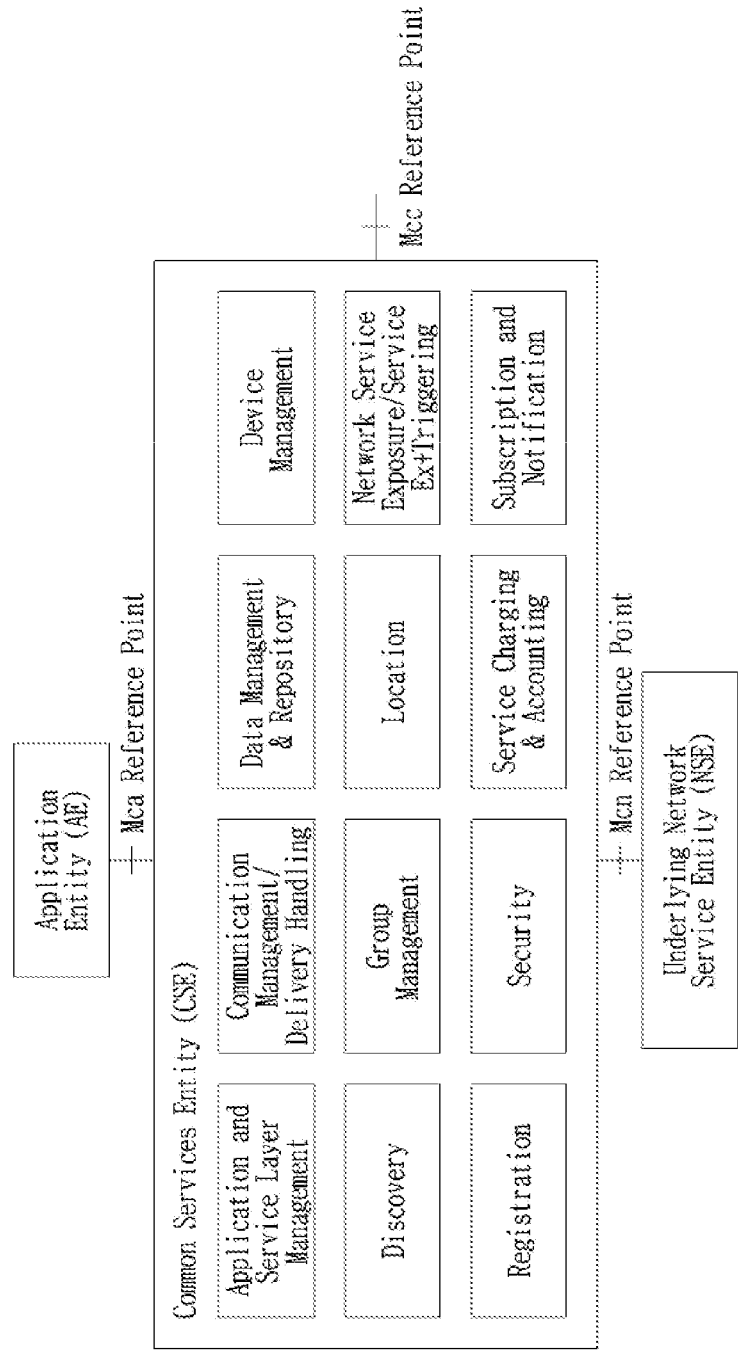
FIG. 4 is a view illustrating a common service function according to the present invention.

FIG. 4 is a view illustrating a common service function. Referring to FIG. 4, common service functions may be provided. For example, a common service function may provide at least any one function among application and service layer management, communication management and delivery handling, data management and repository, device management, discovery, group management, location, network service exposure/service execution and triggering, registration, security, service charging and accounting, service session management, and subscription/notification. Herein, M2M terminals may be configured to operate based on a common service function. In addition, a common service function may be possible in other exemplary embodiments and is not limited to the above-described exemplary embodiment.

In addition, for example, at least any one of an M2M platform, an M2M gateway, an M2M device and an application entity (AE) may be included in an M2M system. For example, an IN may serve as an M2M platform, an MN may serve as an M2M gateway. In addition, an ASN or ADN may be an M2M device and may operate based on the above description. In addition, for example, a CSE is used as a common functional element of an M2M system and may perform a common function, as described above. Herein, to implement the function, the CSE may be included in an ASN that is used as an M2M platform, an M2M gateway and an M2M device, as described above. In addition, for example, an AE may be included in any one of an M2M platform, an M2M gateway, an ASN, and an AND. In addition, for example, an AE may be used alone and is not limited to the embodiment described above.

Herein, for example, a hosting common service entity (H-CSE) may be an entity that holds a resource or attribute, and a registrar common service entity (R-CSE) is may be a CSE with a terminal (or M2M terminal) registered therein. Herein, for example, the terminal may be at least one of ADN, ASN and MN. In addition, for example, R-CSE and H-CSE may be at least one or more among ASN, MN and IN.

For example, a terminal may be configured to acquire a resource from a H-CSE through a R-CSE. Meanwhile, a resource may be expressed based on an object operated in an M2M system. For example, a resource may be defined based on terminal operation information for a specific service and may be indicated based on create/retrieve/update/delete (CRUD). For a more specific example, a terminal (or AE) may obtain attribute information of a resource and a target resource from a H-CSE through a R-CSE. Herein, as described above, the H-CSE may provide the AE with the resource and the attribute information thereof for a specific service. For example, an H-CSE may be a resource server for a special service. For example, a resource server may be a vehicle driving server or a vehicle management server. In other words, a terminal may be configured to obtain information for a specific service from a server based on a resource and operate based on the information. Meanwhile, for example, a CSE in an M2M system may include a transceiver, a processor, and a memory. Based on this, the CSE may be configured to transmit and receive a data packet to and from other nodes to process the data packet. An apparatus configuration will be described later.

In addition, for example, a resource may be configured to store related information through a container and share data with another entity. Herein, the content instance (contentInstance) may be a child resource. In addition, for example, the attribute information of each resource may be a specific description of the resource. Herein, the resource attribute information may be configured to store attribute data of the resource. Based on the above, a terminal (AE) may be configured to obtain a specific resource from an H-CSE through a R-CSE. Herein, the resource may include attribute information as target attribute information. A terminal may be configured to perform an operation for a specific service based on the obtained resource and attribute information.

Figure 5:
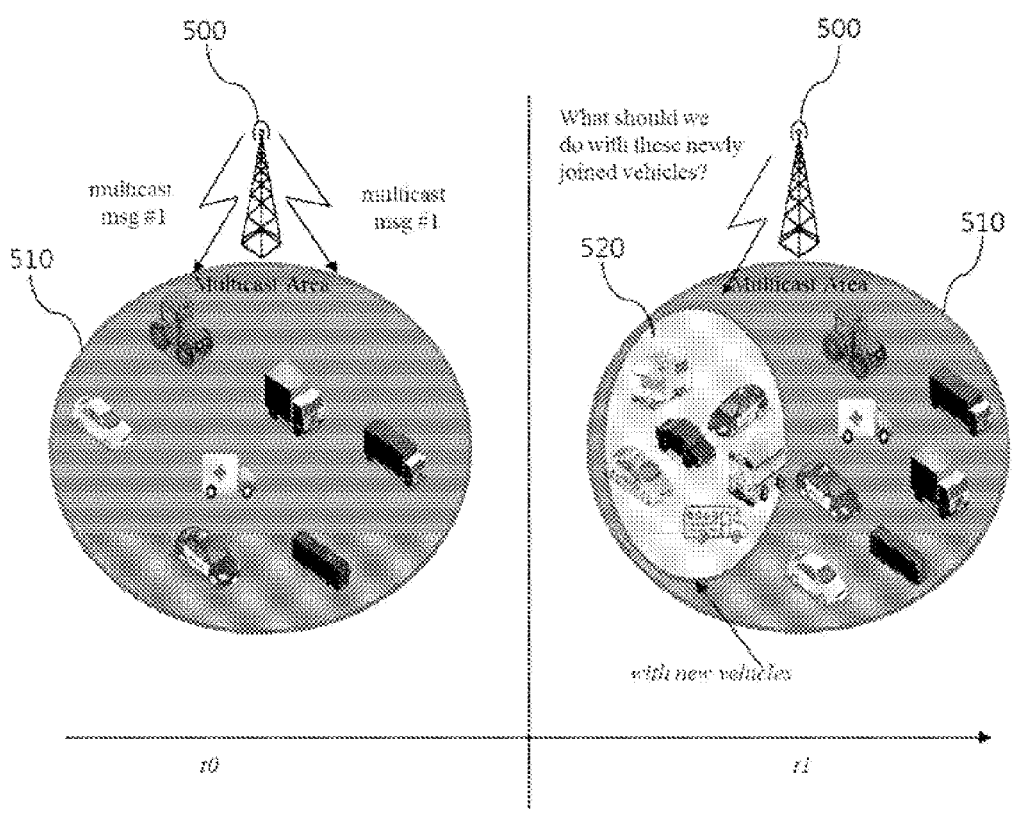
FIG. 5 and FIG. 6 illustrate examples of scenarios in which message repetition transmission and/or retransmission are necessary according to the present invention.
Figure 6:
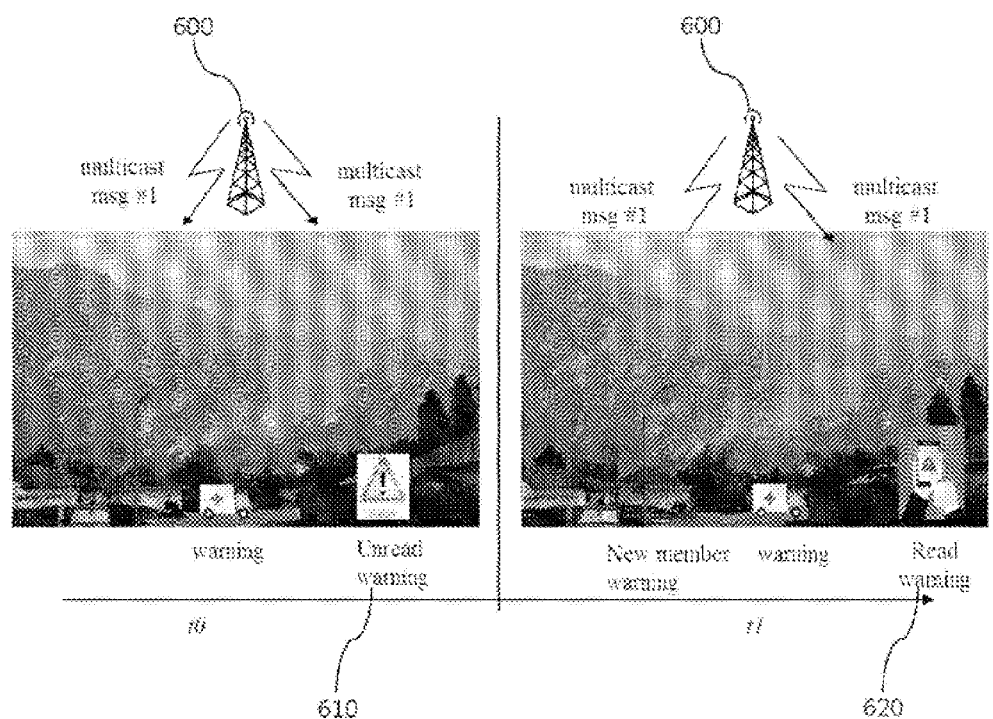

FIG. 5 and FIG. 6 illustrate examples of scenarios in which message repetition transmission and/or retransmission are necessary according to the present invention. In particular, 3GPP multimedia broadcast multicast service (MBMS) is generally known to specify various multicast functions including service notification, search, and message delivery. In addition, according to oneM2M TS-0026 document, it is specified that interworking function with 3GPP including MBMS is supported. Accordingly, in an M2M environment, there is also a scenario in which a same content should be repeatedly transmitted or retransmitted to a user group where a user terminal or member frequently changes.

First, for example, as illustrated in FIG. 5, a message transmission node 500 may be configured to operate a service of transmitting periodically traffic information to a vehicle group located in a specific area 510 (Hereinafter, referred to as "traffic communication area") on a road. Accordingly, when a new user group 520 occurs within the traffic communication area 510, the message transmission node 500 should also be capable of constantly providing same traffic information. In relation to this, a new provision is needed to transmit a message to the new user group 520 in an M2M system. For example, first, unicast transmission for each user terminal may be performed, and then multicast transmission for all the user terminals may be performed. Additionally, as an alternative, for example, after creating or generating and transmitting a temporary multicast group, multicast transmission may be performed by incorporating the temporary multicast group into an original multicast group. Hereinafter, the present invention will describe in detail an efficient message repetition transmission method and/or message retransmission method in an M2M system in a scenario like FIG. 5.

Second, for example, as illustrated in FIG. 6, a message transmission node 600 may be configured to operate a service of transmitting a danger warning message to all user terminals located in a specific area (Hereinafter, referred to as "danger warning area") in which a forest fire occurs. Accordingly, it is necessary to provide repeatedly and periodically a same danger warning message to all user terminals existing within the emergency danger warning area. Herein, when a specific user terminal 610 existing within the emergency danger warning area does not receive the danger warning message, it is necessary to retransmit the danger warning message so that the specific user terminal 610 may receive the danger warning message (620). In addition, according to development of a dangerous situation, it is also necessary to update a danger warning message and to repeatedly transmit the updated warning message again. Accordingly, it is necessary to keep activating the emergency danger warning area as a communication area. Hereinafter, the present invention will describe in detail an efficient message repetition transmission method and/or message retransmission method in an M2M system in a scenario like FIG. 6.

In addition, as in the above-described scenarios of FIG. 5 and FIG. 6, when message repetition transmission is needed, a provision is needed to reduce overhead caused by message repetition transmission between the message transmission nodes 500 and 600 and a user terminal. In other words, a method for reducing overhead caused by message repetition between two entities having mutual communication in an M2M system is also required.

Figure 7:
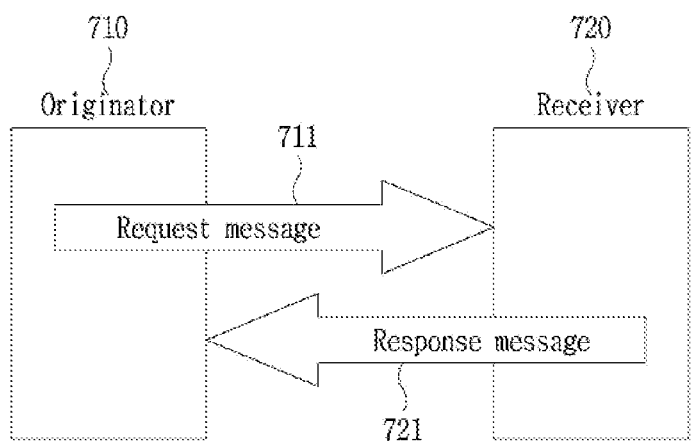
FIG. 7 is a view for explaining an information exchange method based on use of a request message and a response message in an M2M system according to the present invention.

FIG. 7 is a view for explaining an information exchange method based on use of a request message 711 and a response message 721 in an M2M system. A message exchange process including a CSE and an AE is implemented by a message exchange between reference points. For example, the request message and the response message may be applied to communication between an AE and a CSE (Mca reference point) or between CSEs (Mcc reference point). In addition, the communication may be disclosed either by an AE or by a CSE according to a content of a request message. An entity disclosing a request message is especially called "Originator" 710. On the other hand, an entity receiving a request message and sending a corresponding response message is especially called "Receiver" 720.

Accordingly, hereinafter, a method and apparatus for message repetition transmission and retransmission according to the present invention will specify the use of the request message 711 and the response message 721 as a basic process. In addition, as a method and apparatus for message repetition transmission and message retransmission may be configured in various embodiments, the method and apparatus will be separately described in detail according to each embodiment.

Figure 8:
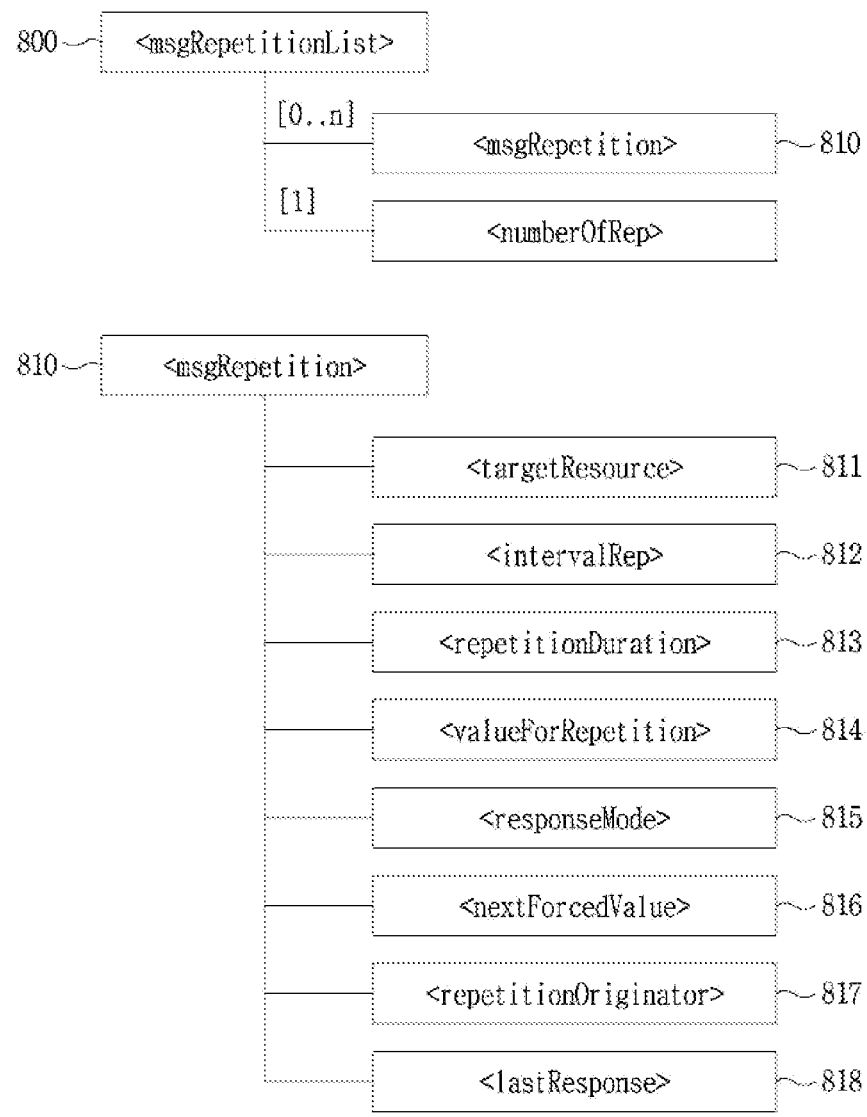
FIG. 8 to FIG. 10 are views for explaining a process of implementing a message repetition transmission method according to an embodiment of the present invention.
Figure 9:
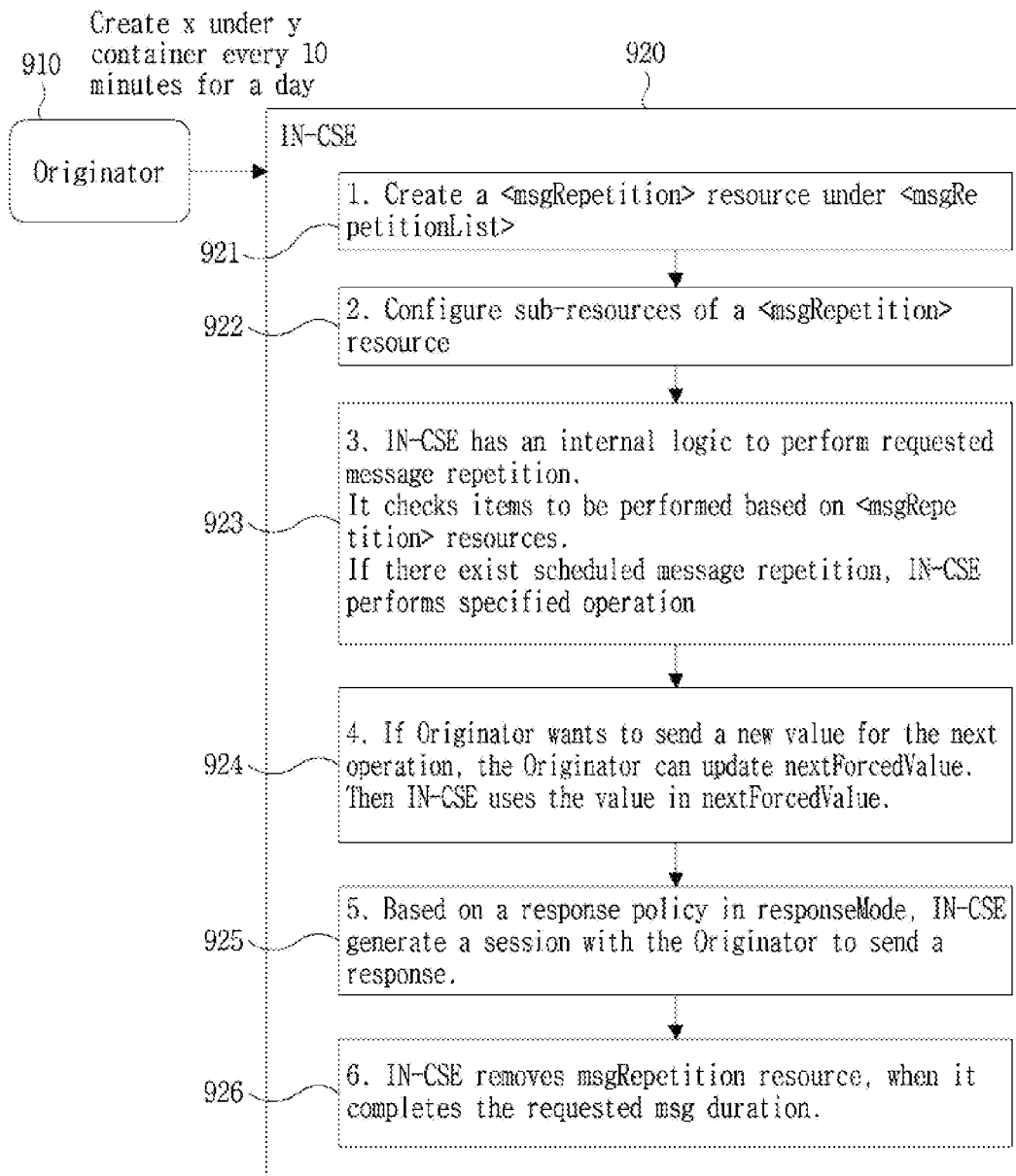
Figure 10:
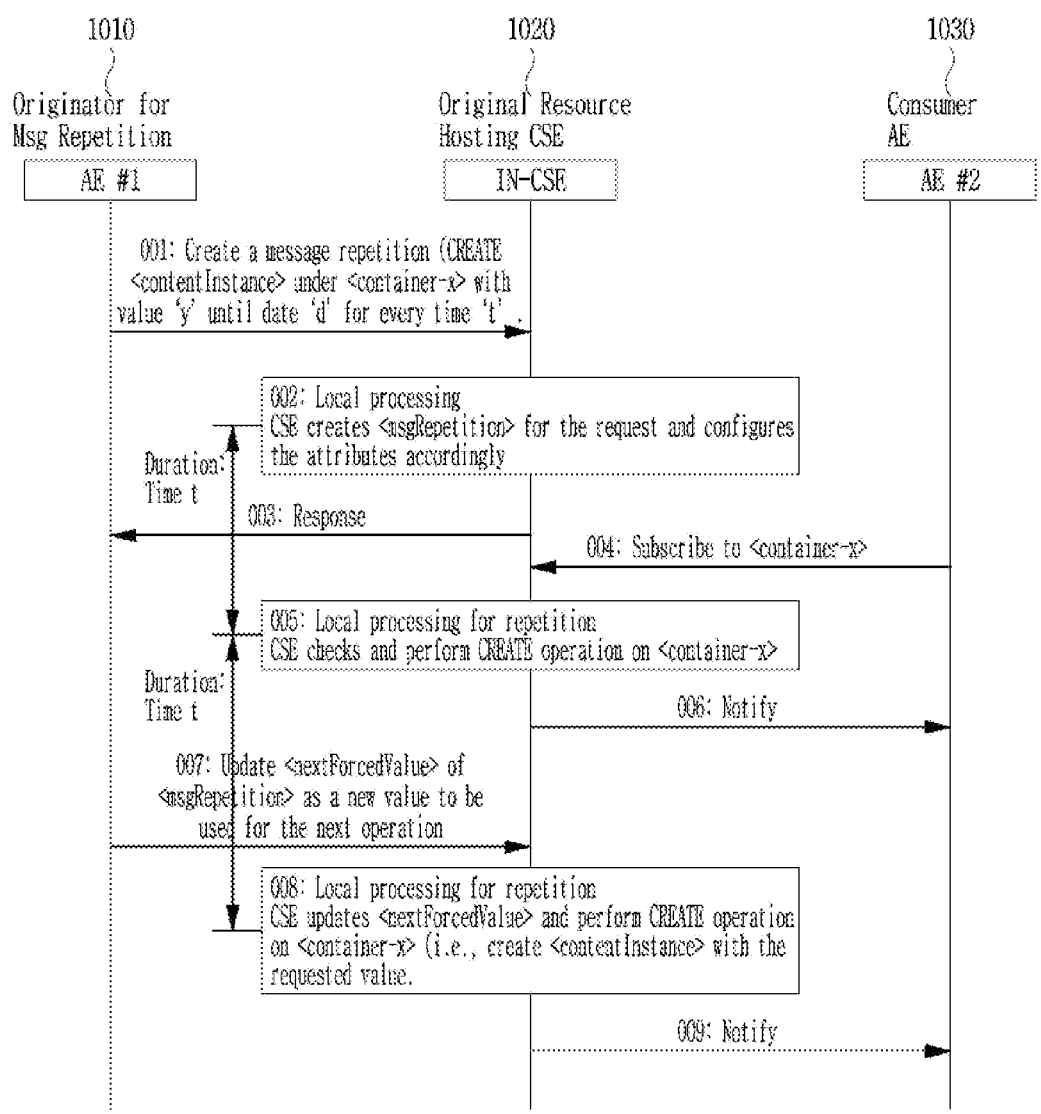

1. Embodiment of Message Repetition Transmission Using a Message Repetition Transmission Resource FIG. 8 to FIG. 10 are views for explaining a process of implementing a message repetition transmission method according to an embodiment of the present invention. Especially, an embodiment of the present invention has a characteristic of newly specifying a message repetition resource (e.g., <msgRepetition>) and attribute information of the resource.

FIG. 8 illustrates an example of a message repetition resource according to an embodiment of the present invention. For message repetition transmission, it is possible to create a separate <msgRepetition> resource 810. Herein, for efficient utilization of the <msgRepetition> resource 810, it is possible to create a <msgRepetitionList> resource 800 above the position of the <msgRepetition> resource. On the other hand, it is also possible to create the <msgRepetition> resource 810 under a conventional <node> resource, instead of creating the <msgRepetition> resource 810 under the specific <msggRepetitionList> resource 800. However, in this case, an entity processor has a burden of continuously checking whether the <msgRepetition> resource 810 exists.

In relation to this, the <msgRepetition> resource 810 may be configured with sub-resources 811 to 818 including at least one or more message repetition (msgRepetition) attributes. Especially, to efficiently perform message repetition transmission, it is necessary to define the attributes. For example, overhead of message repetition transmission may be reduced through the attributes.

Table 1 discloses an example of message repetition (msgRepetition) attributes that are included in the <msgRepetition> resource 810.

TABLE 1

| Attribute Name | Description |
| --- | --- |
| targetResource | Which resource should be created (e.g., contentInstance) |
| targetOperation | Which operation should be performed (CREATE, UPDATE) |
| intervalRep | How often the given operation should be performed to the target resource (e.g., every 10 minutes) |
| repetitionDuration | How many times the repetition should be performed (e.g., 0, 1~finite number, infinite number). After complete repetition during the given amount of time, the parent resource, i.e., <msgRepetition> is removed. |

TABLE 1-continued

| Attribute Name | Description |
| --- | --- |
| valueForRepetition | What is the value to be repeated (e.g., temperature 15 Celsius) |
| responseMode | How to receive response (only once, every 10 minutes, accumulated response, etc.) |
| nextForcedValue | The value to be operated for the next operation. This value is different from the value for <valueForRepetition>. This value becomes None after consumed. If there is value (which is not NONE), the platform must use this value instead of <valueForRepetition>. |
| repetitionOriginator | The originator of the message repetition. |
| lastResponse | Information about the last response to the Originator. |

Specifically, a "targetResource" attribute 811 is information that designates a target resource requiring message repetition transmission. For example, it may mean traffic information, danger warning information and the like and may be indicated by "contentInstance".

In addition, an "intervalRep" attribute 812 is information that designates an interval at which a message repetition transmission operation is performed. For example, it is possible to set an interval time like every one minute, every ten minutes, and every one hour. Accordingly, it is possible to determine the "intervalRep" attribute 812 variously according to types of repetition transmission services. For example, in the case of a danger warning message invoking emergency as in the scenario of FIG. 6, a short interval is preferred.

In addition, a "repetitionDuration" attribute 813 is information that designates the number of times a message repetition transmission operation is performed. For example, it is possible to set the number of times to once, a determined finite number of times, infinite repetition and the like. Accordingly, when repetition is completely performed as many times as specified by the "repetitionDuration" attribute 813, the <msgRepetition> resource may be deleted.

In addition, a "valueForRepetition" attribute 814 is information that designates a target transmission value of message repetition transmission. For example, like a specific temperature and a specific air pollution level, it means specific information to be obtained from repetition transmission. In relation to this, the "valueForRepetition" attribute 814 may be used to define a repeatedly transmitted target resource (e.g., target application service) and a target repetition transmission value by being applied together with the above-described "targetResource" attribute 811. In particular, such attributes are effective in reducing overhead of message repetition transmission as they clarify a target of a repetition transmission message.

In addition, a "responseMode" attribute 815 is information that designates a method of receiving a response message. For example, it may designate a method of configuring a response message like immediately, every 10 minutes, and cumulative response. In addition, a "nextForcedvalue" attribute 816 is information that designates a value applied in next message repetition transmission. Herein, the "nextForcedvalue" attribute 816 is contrasted with the above-described "valueForRepetition" attribute 814. In other words, it means that, while repetition transmission is being performed by the valueForRepetition" attribute 814, if the "nextForcedvalue" attribute 816 is updated, next message repetition transmission should be performed using a value designated by the "nextForcedvalue" attribute, instead of the "valueForRepetition" attribute 814.

In addition, a "repetitionOriginator" attribute 817 is information that designates a transmission node (Originator) requesting message repetition transmission. In addition, a "lastResponse" attribute 818 includes information on a last response that is transmitted to the transmission node (Originator). In addition, a "targetOperation" attribute is information that designates an operation method of message repetition transmission. For example, this may distinguish the operation either as a message creation operation ("CREATE") or as a message update operation ("UPDATE"). Herein, the message creation operation ("CREATE") refers to generating a same message repeatedly, and the message update operation ("UPDATE") refers to transmitting an updated message during repetition transmission.

In addition, although not disclosed in Table 1, a "repetitionMode" attribute may be set. The "repetitionMode" attribute may be information that sets a mode of performing repetition transmission, that is, any one mode, for example, among a unicast mode or a multicast mode or another transmission mode, and designates a mixed use of the transmission modes (e.g., "multicast" followed by "unicast").

FIG. 9 illustrates an example of a process of message repetition transmission according to an embodiment of the present invention. Especially, FIG. 9 is one example showing a detailed response process of an IN-CSE 920, when message repetition attribute information is requested. In other words, when an originator 910 requests message repetition transmission to an IN-CSE 920, a detailed response process of the IN-CSE 920 is as follows. First, for example, the originator 910 may be configured to request the IN-CSE 920 to create information 'x' under a container 'y' every 10 minutes for a day through a request message. Herein, the request message may include at least one or more among the message repetition (msgRepetition) attributes disclosed in the above-described Table 1.

When receiving the request message, first, the IN-CSE 920 may be configured to generate the above-described <msgRepetition> resource under <msgRepetitionList> (921). In addition, it may configure a sub-resource of the <msgRepetition> resource (922). For example, as illustrated in FIG. 8 above, the sub-resource may be configured using a message repetition attribute included in the request message.

Next, the IN-CSE 920 checks the message repetition transmission by an internal processor (923). For example, the IN-CSE 920 may be configured to determine whether message repetition transmission is performed, based on the created <msgRepetition> resource and a sub-resource in which a message repetition attribute is set. In other words, based on a set message repetition attribute, it is possible to determine at least a target, an interval, a duration and a value of message repetition transmission. In addition, when scheduled message repetition exists, the IN-CSE 920 may be configured to perform a responding operation.

Herein, when the originator 910 wants to receive a new repetition transmission value, the originator 910 may be configured to update the above-described nextForcedValue attribute. Next, the IN-CSE 920 performs next message repetition transmission using a value designated by the nextForcedValue attribute (924). In addition, the IN-CSE 920 may be configured to set a response policy based on the above-described responseMode attribute, create a session for transmitting a response message to the originator 910, and start transmitting the response message (925). Next, when it is confirmed, based on the above-described repetitionDuration attribute, that message repetition duration is completed, the IN-CSE 920 may be configured to delete the <msgRepetition> resource and finish message repetition transmission (926).

FIG. 10 illustrates an example of another process of message repetition transmission according to an embodiment of the present invention. Especially, FIG. 10 is a specific example showing how a message repetition attribute is used in a repetition transmission process. AE #1 1010 transmits a request message requesting message repetition transmission (001). Herein, for example, for <container-x> of CREATE <contentInstance>, it is possible to designate a repetition transmission attribute every 't' time until date 'd'.

IN-CSE 1020 verifies reliability of the AE #1 1010. For example, it checks <container-x> and an access control policy of AE #1 1010. Herein, when there is no error, the IN-CSE 1020 may be configured to generate <msgRepetition> under <msgRepetitionList> together with requested information (002). In addition, the IN-CSE 1020 may be configured to transmit the successful creation of the <msgRepetition> as a response to a request message of the AE #1 1010 (003). For example, such a response may be an Ack message.

Herein, another AE #2 1030 may be configured to request subscription of <container-x> to the IN-CSE 1020 (004). After time T, the IN-CSE 1020 checks the existence of <msgRepetition> related to <container-x> and creates <contentInstance> for the <container-x> (005). Herein, for example, <contentIstance> with value 'y' may be created.

Herein, the AE #2 1030 receives a notification of creation of new <contentInstance> in the <container-x> (006). In addition, when the AE #1 1010 wants to request a value (e.g., 'z') different from a value ('y') designated by a previously configured valueForRepetition attribute, the AE #1 1010 may be configured to transmit a request message that requests to update nextForcedValue among message repetition attributes of <msgRepetition> resource (007).

The IN-CSE 1020 updates the nextForcedValue attribute. Next, after time 't', it checks the existence of <msgRepetition> resource related to <container-x> and creates (CREATE)<contentInstance> for the <container-x> (008). Herein, <contentInstance> with the updated value 'z' may be generated. Next, the IN-CSE 1020 may internally remove the nextForcedValue attribute. This aims to prepare for receiving nextForcedValue again.

Finally, the AE #2 1030 receives notification of creation of new <contentInstance> with <container-x>'z' value (009). Accordingly, by applying the message repetition transmission processes of FIG. 9 and FIG. 10, it is possible to solve the problem of message repetition transmission, which is required in the above-described scenarios of FIG. 5 and FIG. 6. For example, when a traffic information application service operator (e.g., AE) transmits a request message including the message repetition attribute information to a communication base station (e.g., IN-CSE), the communication base station (e.g., IN-CSE) becomes capable of repeatedly transmitting a traffic information message to user terminals within a traffic communication area based on set message repetition attribute information.

Figure 15:
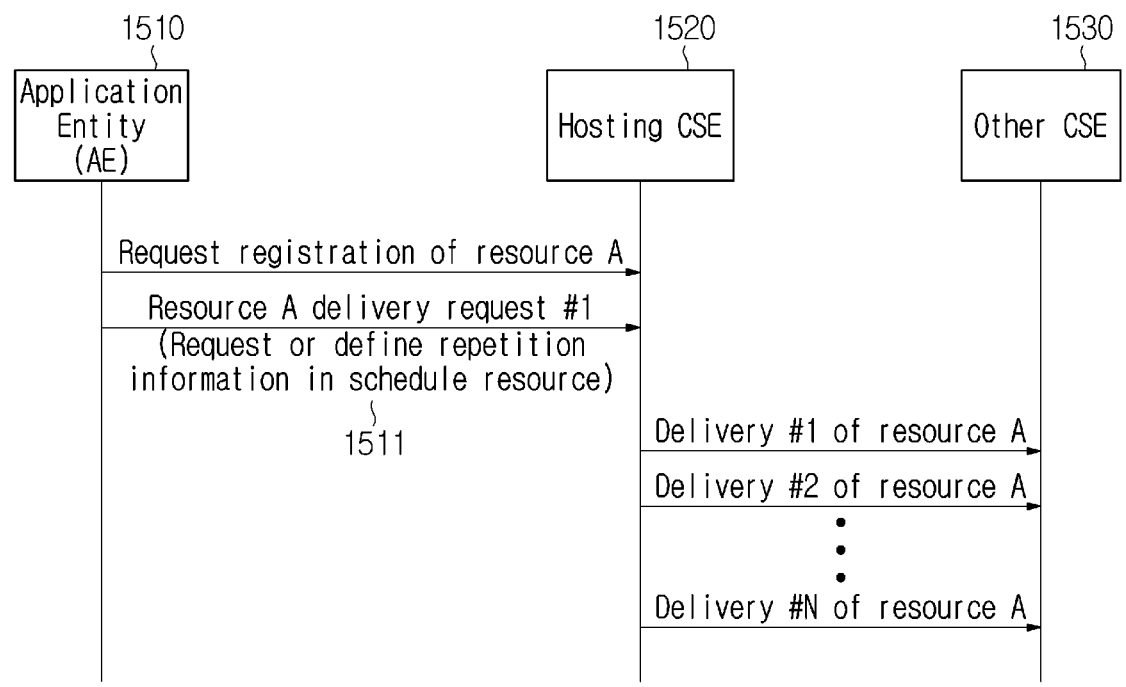
FIG. 15 to FIG. 16 simply illustrate an example of message repetition transmission according to the present invention.
Figure 16:
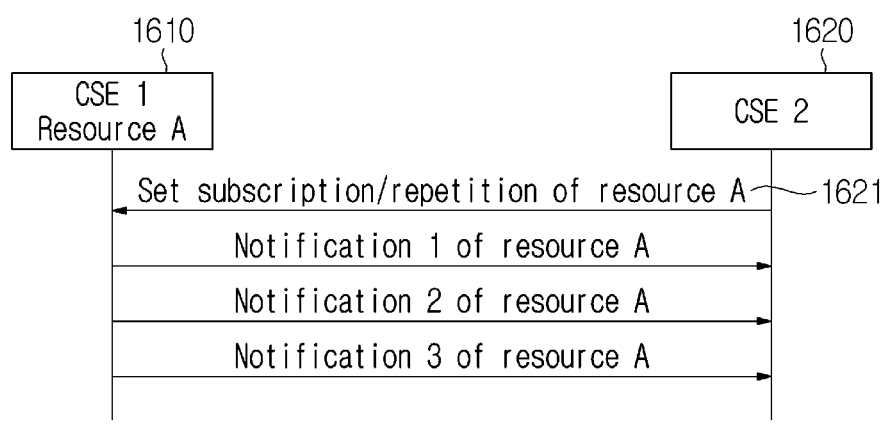

2. Embodiment of Message Repetition Transmission Using Publish-Subscribe Resource Hereinafter, based on another embodiment of the present invention, a process of performing the message repetition transmission will be described. FIG. 15 to FIG. 16 simply illustrate an example of message repetition transmission according to the present invention. For example, a oneM2M system is described as an example. However, the present invention is not limited to a oneM2M system.

In a oneM2M system, which was being developed before the present invention, for message repetition delivery, an application entity (AE) had to constantly transmit a delivery request for a registered resource. This may be a significant burden of overhead for AE. To reduce a burden required to the AE, the present invention proposes to use a repetition transmission resource and repetition transmission attribute information.

For example, as illustrated in FIG. 15, the present invention proposes a process in which an AE 1510 sets attribute information for repetition transmission of a specific resource A within a message repetition transmission resource (1511) and delivers this in a request message form to a hosting CSE 1520. For example, the message repetition transmission resource may be a <Request> resource and/or a <Schedule> resource. Accordingly, the hosting CSE 1520 receiving the request message becomes capable of repeatedly delivering the resource A to another CSE 1530 in response to the request message. Accordingly, the process may minimize an overhead burden for AE by minimizing a repetition delivery request of AE 1510.

Additionally, a oneM2M system, which was being developed before the present invention, adopted a Publish-Subscribe based message delivery method. Accordingly, in a oneM2M system before the present invention, for example, when constant notification of a specific resource (e.g., a resource requesting notification of particulate matter (PM) levels) was wanted, it was necessary to create a multiple number of same subscription conditions. Thus, it is possible to receive a multiple number of corresponding notifications, but this method is inefficient. To improve inefficiency required to the AE, the present invention proposes to use a repetition transmission resource (e.g., <subscription> resource) and repetition transmission attribute information.

For example, as illustrated in FIG. 16, a CSE2 1620 requesting repeated subscription to the resource A may be configured to transmit a subscription request message 1621 including repetition attribute information within <subscription> resource. A CSE1 1610 receiving the subscription request message 1621 becomes capable of repeatedly performing notification for the resource A based on the set repetition attribute information.

Hereinafter, a detailed message repetition transmission resource and repetition transmission attribute information, which support the basic processes of FIG. 15 and FIG. 16 above, will be described in detail. In relation to this, the subscription resource may include a notification policy that defines a time and method of sending a corresponding notification. Herein, repetition transmission may be set as one of the notification policy. For example, as a method of configuring a message repetition transmission resource, it is possible to add repetition attribute information into a message repetition transmission resource. In addition, a subscriber may configure a method of receiving a repetition transmission notification within a message repetition transmission resource. In addition, a source creator may define a resource attribute forcing message repetition within a message repetition transmission resource.

Generally, a subscriber may request notification of a specific resource as a subscription mode. For example, an alarm or warning message request for a specific resource may be one example. However, in general, as a subscriber is not convinced that a corresponding message notification is received, the subscriber may want to repeatedly receive the message notification. In the present invention, such a case is referred to as a subscriber oriented message repetition request. In addition, for example, when a source creator is an emergency management center or a traffic management center corresponding to the above-described scenarios of FIG. 5 and FIG. 6, the source creator itself may want forced message repetition transmission. In the present invention, such a case is referred to as a creator oriented message repetition request.

originator should be capable of creating a resource of the <subscription> resource type. In other words, an originator creating a <subscription> resource may be a resource subscriber. In addition, a <subscription> resource may be configured to reject and block "UPDATE" for an "UPDATE" request to change a resource or a resource attribute. In addition, a <subscription> resource may include a notification policy that designates a target to be notified, a time and a method. In addition, when a <subscription> resource is deleted, if there is a target indicated by a subscriber, it should be possible to transmit a notification request to the target. Herein, the target to be notified may be designated by a subscriberURI attribute.

Table 2 discloses examples of attribute information within the <subscription> resource at the subscriber oriented message repetition request.

TABLE 2

| Attributes of <subscription> | Multiplicity | RW/ RO/ WO | Description |
|---|---|---|---|
| notiRepetition | 0 . . . 1 | RW | Indicates that the subscriber wants to get a notification for a given number of times. If this value is 1, then the notification is sent as a normal way, i.e., sent once. But If this value is greater than 1, notification should be sent the given number of times. For example, if the value is 3, notification should be sent three times. |
| notiInterval | 0 . . . 1 | RW | Indicates that repeated notifications should be sent in a given interval. |
| startRepetition | 0 . . . 1 | RW | This attribute is an optional attribute to be used with notiRepetition to indicate when to start notification repetition. |
| endRepetition | 0 . . . 1 | RW | This attribute is an optional attribute to be used with notiRepetition in order to indicate when to finish repeating notification. |

Hereinafter, specific ways of implementing the subscriber oriented message repetition request method and the creator oriented message repetition request method respectively are proposed.

(1) Subscriber Oriented Message Repetition Request

The present invention proposes to use a <subscription> resource and to use a <schedule> resource respectively as the subscriber oriented message repetition request method.

First, according to the present invention, characteristics of the <subscription> resource may be summarized as follows. The <subscription> resource includes subscription information for a resource to be subscribed. For example, for subscription of a specific resource, the <subscription> resource may be requested to an M2M architecture entity. In other words, <subscription> resource refers to subscription to a specific resource. To complete subscription, it is necessary to create the <subscription> resource as a sub-resource of a resource to be subscribed. Accordingly, the sub-<subscription> resource should include an accurate subscription scope and information on an object to be notified. For example, when the <subscription> resource exists as a child resource under a parent <container> resource, it should be configured as a child <subscription> resource that meets a notification event criterion described in the parent <container> resource. In addition, for example, a child <subscription> resource may also be deleted when a parent resource to be subscribed is deleted.

In addition, in general, when an originator has RETRIEVE permission for a <subscription> resource, the Herein, to configure a message repetition policy, a subscriber may be equipped with additional attribute information within the <subscription> resource.

When a corresponding value is 0 or 1, the "notiRepetition" attribute may perform response notification in a predetermined way (e.g., no notification or once). On the other hand, when the "notRepetition" attribute value is greater than 1, response notification may be performed as many times as the value. For example, when the corresponding value is designated as 3, response notification may be repeated three times.

Additionally, the "notiInterval" attribute is information that designates an interval of repeated notifications. The "startRepetition" attribute is information that designates a start time of repetition transmission. In addition, the "endRepetition" attribute is information that designates an end time of repetition transmission. In relation to this, further detailed disclosures for the attributes are presented in the description part of Table 2.

Accordingly, by setting additional attribute information in a <subscription> resource, it is possible to implement message repetition transmission according to the present invention. This will be an example in which a message repetition transmission process is implemented while maintaining compatibility with an existing M2M system.

Next, using a <schedule> resource of an M2M system is proposed as another method of implementing message repetition transmission at a subscriber oriented message repetition request according to the present invention. The <schedule> resource may include scheduling information. In addition, the <schedule> resource may be a child resource of the above-described repeated creation resource <megRepetition>. In addition, the <schedule> resource may be a child resource of the subscription resource <subscription>.

Table 3 discloses examples of attribute information within the <schedule> resource at the subscriber oriented message repetition request.

TABLE 3

| Attributes of <schedule> | Multiplicity | RW/RO/WO | Description |
| --- | --- | --- | --- |
| repetitionPolicy | 0 . . . 1 | RW | Indicates how to handle consecutive notifications. If the value is 0, all the scheduled notifications regardless of the order will be sent out. If the value is 1, the remaining notifications for the previous notification will be ignored. |
| scheduleElement | 1(L) | RW | Each item of the scheduleElement list shall be OA composed from seven fields of second, minute, hour, day of month, month, day of week and year. Optionally, notification identifier can be added to distinguish notifications. |

Herein, to configure a message repetition policy, a subscriber may be equipped with additional attribute information within the <schedule> resource. The "repetitionPolicy" attribute is information that designates how to perform repeated notification. For example, when a corresponding value is 0, all the scheduled notifications may be transmitted regardless of the notification order. On the other hand, when a corresponding value is 1, notification left behind a previous notification may not be transmitted but be ignored.

Additionally, the "scheduleElement" attribute may include seven fields constituting repeated notification schedule time. For example, the seven fields may be composed of second, minute, hour, day of month, month, day of week, and year. In addition, selectively, a "Notification Identifier" attribute may further be added to distinguish repeatedly transmitted notifications. For example, to distinguish repeatedly transmitted notifications, the "Notification Identifier" attribute value may be implemented to increase by 1. (e.g., noti-00001, noti-00002, . . . )

In relation to this, further detailed disclosures for the attributes are presented in the description part of Table 3. Accordingly, by setting additional attribute information in a <schedule> resource, it is possible to implement message repetition transmission according to the present invention. This will be an example in which a message repetition transmission process is implemented while maintaining compatibility with an existing M2M system.

(2) Creator Oriented Message Repetition Request

The present invention proposes to use a <resource name> resource as the creator oriented message repetition request method. A creator may mean a publisher. A creator, which creates a source resource (e.g., container resource), may configure a repetition transmission policy of the created source resource.

Table 4 discloses examples of attribute information within the <resource name> resource at the creator oriented message repetition request.

TABLE 4

| Attributes of <resource name> | Multiplicity | RW/RO/WO | Description |
| --- | --- | --- | --- |
| notiRepetitionMode | 0 . . . 1 | RW | Indicates that the subscriber wants to get a notification for a given number of times. If this value is 1, then the notification is sent as a normal way, i.e., sent once. But If this value is greater than 1, notification should be sent the given number of times. For example, if the value is 3, notification should be sent three times. |
| notiInterval | 0 . . . 1 | RW | Indicates that repeated notifications should be sent in a given interval. |

In particular, to configure a message repetition policy, a source resource creator may include a message repetition transmission policy in the <resource name> resource. The "notiRepetitionMode" attribute is information that designates a repetition transmission mode. For example, when a corresponding value is 1, response notification may be performed in a predetermined usual way (e.g., one-time notification). On the other hand, when a corresponding value is greater than 1, response notification may be repeatedly transmitted as many times as a set number. For example, when a corresponding value is set to 3, repetition transmission may be performed three times.

In addition, the "notiInterval" attribute is information that designates an interval at which repeated notification of message is performed. For example, it may be set to every 10 minutes, every hour, etc. When a specific subscriber creates a subscription resource for the source resource, the creator may be configured to set a message repetition transmission policy by using the attributes. In particular, when repetition transmission attributes as in Table 2 described above are set in a <subscription> resource of a subscriber, if a creator receives a repetition transmission attribute request of the subscriber, a reception message (e.g., Ack) may be transmitted. On the other hand, when repetition transmission attribute information in a <subscription> resource of a subscriber violates a repetition transmission policy set by a creator, a message (e.g., Nack) for rejecting a repetition transmission attribute request of the subscriber may be transmitted. In relation to this, as described above, when message repetition transmission policies are different between a creator and a subscriber, it may be necessary to prepare an arbitration policy for solving the difference in an M2M system. For example, it is possible to set which message repetition transmission policy is to be preferred between a creator and a subscriber according to scenarios, and such message repetition transmission policy may be used as an arbitration policy.

Also, Table 5 discloses examples of other attribute information within the <resource name> resource at the creator oriented message repetition request.

TABLE 5

| Attributes of <resource name> | Multiplicity | RW/ RO/ WO | Description |
| --- | --- | --- | --- |
| notiRepetition | 0 . . . 1 | RW | Indicates that the current content should be notified repeatedly to its subscribers. The value of this attributes indicates the number of repetition times. |
| notiInterval | 0 . . . 1 | RW | Indicates that repeated notifications should be sent in a given interval. |

The "notiRepetition" attribute is information that designates forced repetition transmission. For example, regardless of a repeated subscription request or repetition transmission request of a subscriber or a requester, a source creator may be configured to repeatedly transmit a specific resource to all the related subscribers and requesters in a forcible way. For example, when a corresponding source resource is an emergency resource of the above-described scenario in FIG. 6, forced repetition transmission may be performed.

In relation to this, the number of times of being repeatedly transmitted needs to be set separately. For example, the above-described "notiRepetitionMode" attribute in Table 4 may be utilized. Additionally, the "notiInterval" attribute is information that designates an interval at which repeated notification of message is performed. For example, it may be set to every 10 minutes, every hour, etc.

Accordingly, by setting additional attribute information in a <resource name> resource, it is possible to implement creator-oriented message repetition transmission according to the present invention. This will be an example in which a message repetition transmission process is implemented while maintaining compatibility with an existing M2M system.

3. Embodiment of Message Repetition Transmission Using a Group Resource

Hereinafter, according to an embodiment of the present invention, a message repetition transmission method using a group resource and corresponding resource attribute information will be described. For example, a oneM2M system is described as an example. However, the present invention is not limited to a oneM2M system.

A oneM2M system, which was being developed before the present invention, was capable of using a <group> resource to transmit a request message or a response message simultaneously to a multiplicity of users of a same group. However, the <group> resource had a limitation in implementing message repetition transmission according to the present invention. Accordingly, it is proposed that a message repetition transmission process according to the present invention is implemented by newly defining attribute information for repetition transmission within the <group> resource.

Table 6 discloses examples of attribute information for repetition transmission that is additionally set within the <group> resource in order to implement a message repetition transmission process according to the present invention.

TABLE 6

| Attributes of <group> | Multi- plicity | RW/ RO/ WO | Description |
| --- | --- | --- | --- |
| startMulticastRepetition | | | starting time of multicast repetition |
| endMulticastRepetition | | | finishing time of multicast repetition |
| maxNrOfRepetition | | | maximum number of repetition |
| currentNrOfRepetition | | | how many times the message is sent out |
| currentSessionID | | | identifier of the current message |
| repetitionMode | | | how to handle newly joined members (unicast? Temporary multicast? No action?) |
| memberNewlyJoined | | | list of members that join the group but not yet informed |
| membersNotRead | | | list of members that didn't read message |

The "startMulticastRepetition" attribute is information that designates a start time of multicast repetition. The "endMulticastRepetition" attribute is information that designates an end time of multicast repetition. The "maxNrOfRepetition" attribute is information that designates a maximum number of repetition transmission. The "currentNrOfRepetition" attribute is information that designates a number of times repetition transmission is performed. The "currentSessionID" attribute is information that designates identification of a current message.

In addition, the "repetitionMode" attribute is information that designates which transmission mode is to be applied to members that newly join a group (e.g., user terminals). For example, any one among unicast transmission, temporary multicast and no-action may be selected. Particularly, the "repetitionMode" attribute may be used as attribute information to determine how to perform message transmission to vehicles that newly join a traffic communication area in the above-described scenario of FIG. 5. In addition, it may be used as attribute information to determine how to perform message transmission to user terminals in an emergency danger warning area where a dangerous situation occurs in the above-described scenario of FIG. 6.

Additionally, the "memberNewlyJoined" attribute is information that sets a list of users that are new members (e.g., user terminals) of a group but have not received a message yet. The "membersNotRead" attribute is information that sets a list of users that are new members (e.g., user terminals) of a group but have not read a transmitted message yet. In particular, the "memberNewlyJoined" attribute and the "membersNotRead" attribute may be used as attribute information to identify vehicles, which newly join a traffic communication area in the above-described scenario of FIG. 5, and to identify a user not having received a message yet among the vehicles. In addition, they may be used as attribute information to identify user terminals, which newly join an emergency danger warning area, in which a dangerous situation occurs, in the above-described scenario of FIG. 6 and to identify a user terminal not having received a message yet among the user terminals.

In relation to this, to implement a message repetition transmission process according to the present invention, it is also possible to generate a <multicastrepetition> resource as a child resource under the <group> resource and to define attributes for performing multicast repetition transmission. In addition, to implement a message repetition transmission process according to the present invention, it is possible to generate a <fanoutPoint> resource as a child resource under the <group> resource and, when performing multicast repetition transmission, to update every <fanoutPoint> resource attribute value to a same value.

Herein, a method of implementing multicast repetition transmission for a new member, which newly joins a multicast group, is as follows. First, which transmission mode between unicast and multicast is applied to a new member is confirmed by checking the "repetitionMode" attribute. When unicast transmission is set, a group hosting CSE first performs unicast message transmission for a member that newly joins and removes the new member from the multicast group after the unicast transmission. On the other hand, when multicast transmission is set, a group hosting CSE generates a new sub-multicast group composed of members, which newly join, and performs multicast (e.g., <fanoutPoint> resource update) for the newly created sub-multicast group. After the multicast transmission, the new sub-multicast group is removed from the multicast group.

Table 7 discloses examples of attribute information for repetition transmission that is additionally set within a <schedule> resource to implement a message repetition transmission process according to the present invention.

TABLE 7

| Attributes of <schedule> | Multi-plicity | RW/RO/WO | Description |
|---|---|---|---|
| startMulticastSchedule | | | starting time of multicast repetition |
| endMulticastSchedule | | | finishing time of multicast repetition |

TABLE 7-continued

| Attributes of <schedule> | Multi-plicity | RW/RO/WO | Description |
|---|---|---|---|
| maxNrOfRepetition | | | maximum number of repetition |
| currentNrOfRepetition | | | how many times the message is sent out |
| currentSessionID | | | identifier of the current message |

The "startMulticastSchedule" attribute is information that designates a start time of multicast repetition. The "endMulticastSchedule" attribute is information that designates an end time of multicast repetition. The "maxNrOfRepetition" attribute is information that designates a maximum number of repetition transmission. The "currentNrOfRepetition" attribute is information that designates a number of times repetition transmission is performed. The "currentSessionID" attribute is information that designates identification of a current message.

For example, as a child resource of a <node> resource, a <schedule> resource is available when a corresponding node designates a time interval, at which communication is possible through a network. Accordingly, by adding message repetition transmission attribute information of the present invention to the <schedule> resource, message repetition may be implemented at a time when communication is possible.

4. Embodiment of Message Retransmission Using a Resource and Attribute Information Hereinafter, according to the present invention, a message retransmission method using an M2M resource and attribute information will be described. As described in the scenarios of FIG. 5 and FIG. 6 above, there may be information that should be transmitted to all the user terminals in a specific area. For example, such information may be traffic accident information and forest fire warning information. In particular, since such warning information should be transmitted to all the user terminals in a corresponding area, when transmission failure occurs in a specific user terminal or all the user terminals, a retransmission function is required. In addition, as recent vehicle terminals frequently fail to receive the main warning information due to a fast driving speed, a solution to this is also required. Accordingly, when multicast transmission fails, a process of retransmitting a corresponding failed message needs to be implemented.

Table 8 discloses examples of attribute information for repetition transmission that is additionally set within the <group> resource in order to implement a message retransmission process according to the present invention.

TABLE 8

| Attributes of <group> | Multi-plicity | RW/RO/WO | Description |
|---|---|---|---|
| maxNrOfRetransmission | — | — | maximum number of retransmissions |
| currentNrOfRetransmission | — | — | current number of retransmissions. It shall not be larger than maxNrOfRetransmission. |
| memberNotDelivered | — | — | Identifier of members not delivered |
| membersNotRead | | | list of members that didn't read message |

TABLE 8-continued

| Attributes of <group> | Multi-plicity | RW/RO/WO | Description |
|---|---|---|---|
| RetransmissionMode | — | — | Unicast or MBMS |
| maxRetransmissionTime | — | — | Time limitation |
| startWindowRetransmission | — | — | Retransmission should start within the given time window |

The "maxNrOfRetransmission" attribute is information that designates a maximum number of times retransmission is performed. The "currentNrOfRetransmission" attribute is information that designates a current number of times retransmission is performed. For example, a "currentNrOf-Retransmission" attribute value cannot be greater than a maximum number of times retransmission is performed.

In addition, the "memberNotDelivered" attribute is information that designates a member to which a retransmitted message is not delivered. The "memberNotRead" attribute is information that designates a member which has received a transmitted message but not read the message yet. The "RetransmissionMode" attribute is information that designates a retransmission mode. For example, it may select one of unicast transmission and MBMS transmission (e.g., 3GPP). The "maxRetransmissionTime" attribute is information that designates a retransmission time limitation. The "startWindowRetransmission" attribute is information that designates a time window interval in which retransmission is to be performed.

Particularly, the "memberNotDelivered" attribute and the "membersNotRead" attribute may be used as attribute information to identify vehicles, which newly join a traffic communication area in the above-described scenario of FIG. 5, and to identify a user not having received a message yet among the vehicles. In addition, especially, they may be used as attribute information to identify user terminals, which newly join an emergency danger warning area, in which a dangerous situation occurs, in the above-described scenario of FIG. 6 and to identify a user terminal not having received a message yet among the user terminals. Also, the "RetransmissionMode" attribute may be used to determine a communication mode that is applied to user terminals requiring the retransmission.

Table 9 discloses examples of attribute information for retransmission that is additionally set within a <localMulticastGroup> resource to implement a message retransmission process according to the present invention.

TABLE 9

| Attributes of < localMulticastGroup > | Multiplicity | RW/RO/WO | Description |
|---|---|---|---|
| TMGI | 0 . . . 1 | RW | The Temporary Mobile Group Identity is allocated to identify the MBMS bearer service as specified in 3GPP TS 23.246. It's used to uniquely identify the 3GPP multicast or broadcast message with externalGroupID together. |
| retransmissionTMGI | | | TMGI for retransmission |

Existing in an existing <localMulticastGroup> resource, the "TMGI" attribute is information indicating whether a local multicast group supports an MBMS service that is defined in 3GPP. For example, as an M2M system has an interworking function with 3GPP MBMS, the attribute is information for requesting and identifying it. In other words, for example, when "TMGI=1", it may be defined that MBMS is supported. On the other hand, when "TMGI=0", it may be defined that MBMS is not supported. Additionally, the "retransmissionTMGI" attribute is information that indicates TMGI in retransmission.

Figure 11:
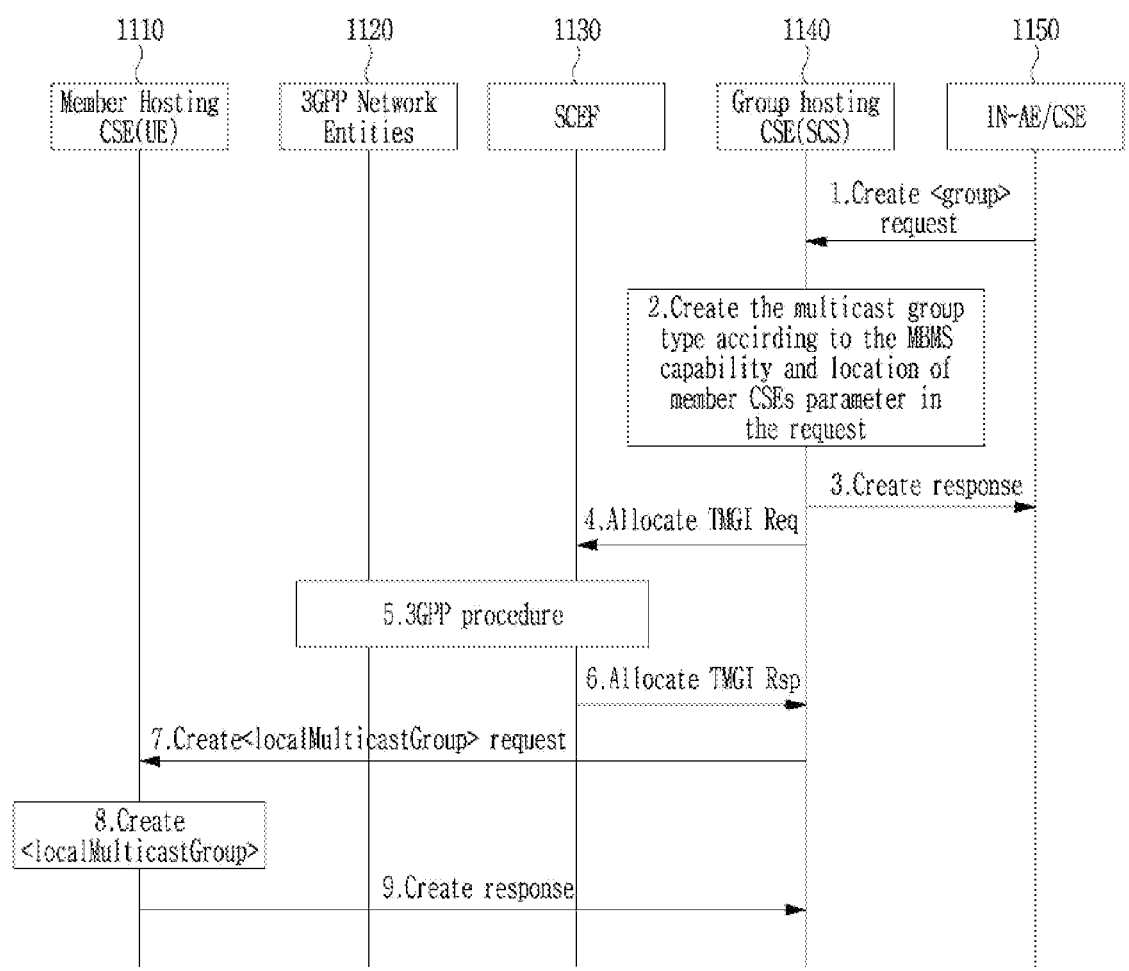
FIG. 11 to FIG. 14 illustrate an example of a process of implementing a message retransmission method according to an embodiment of the present invention.
Figure 12:
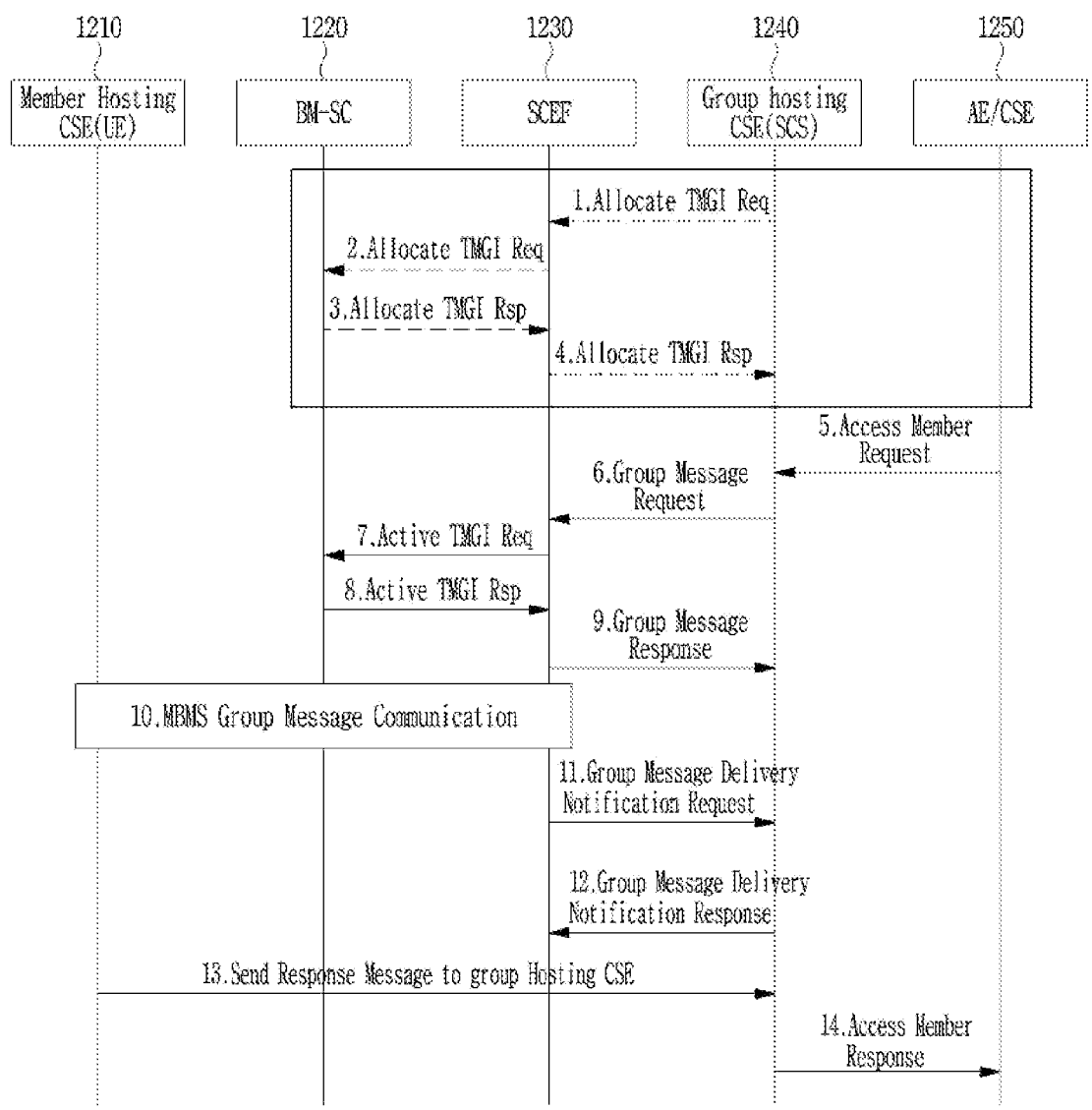
Figure 13:
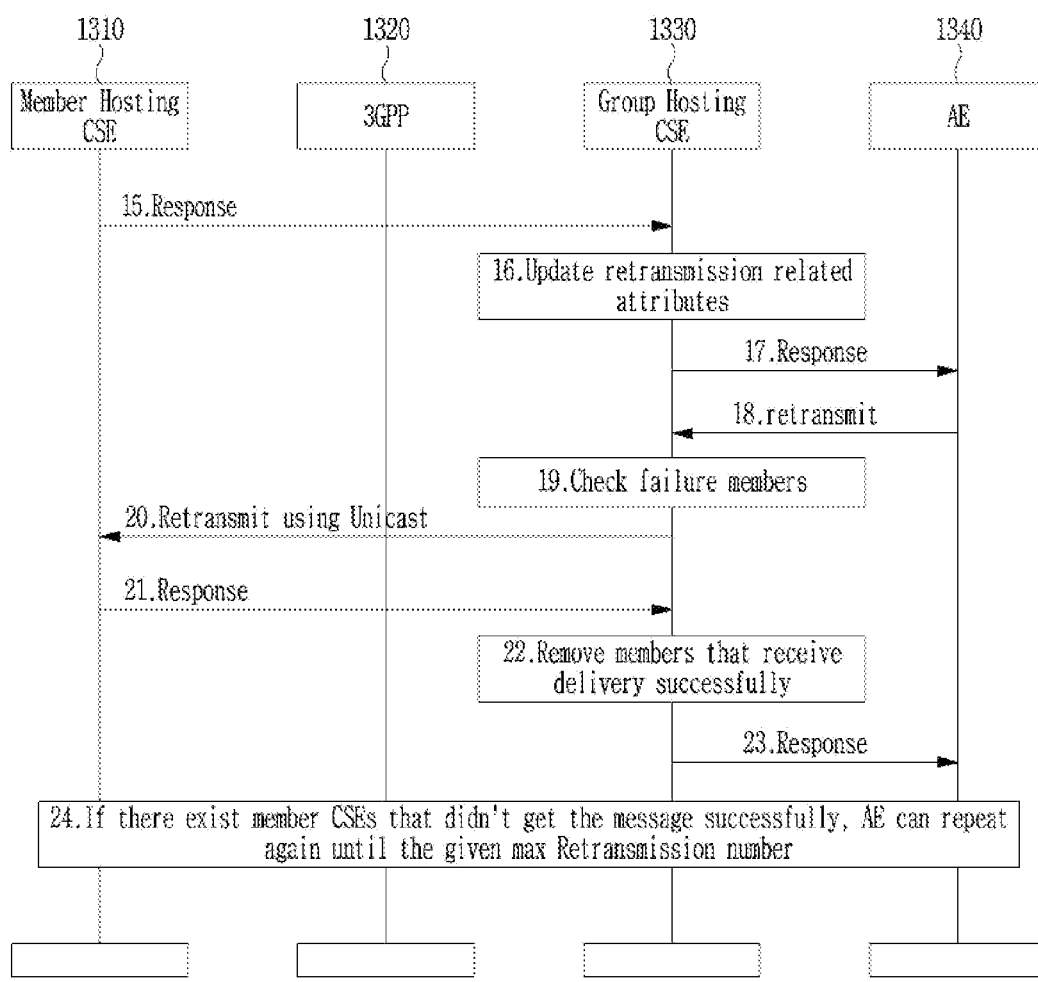
Figure 14:
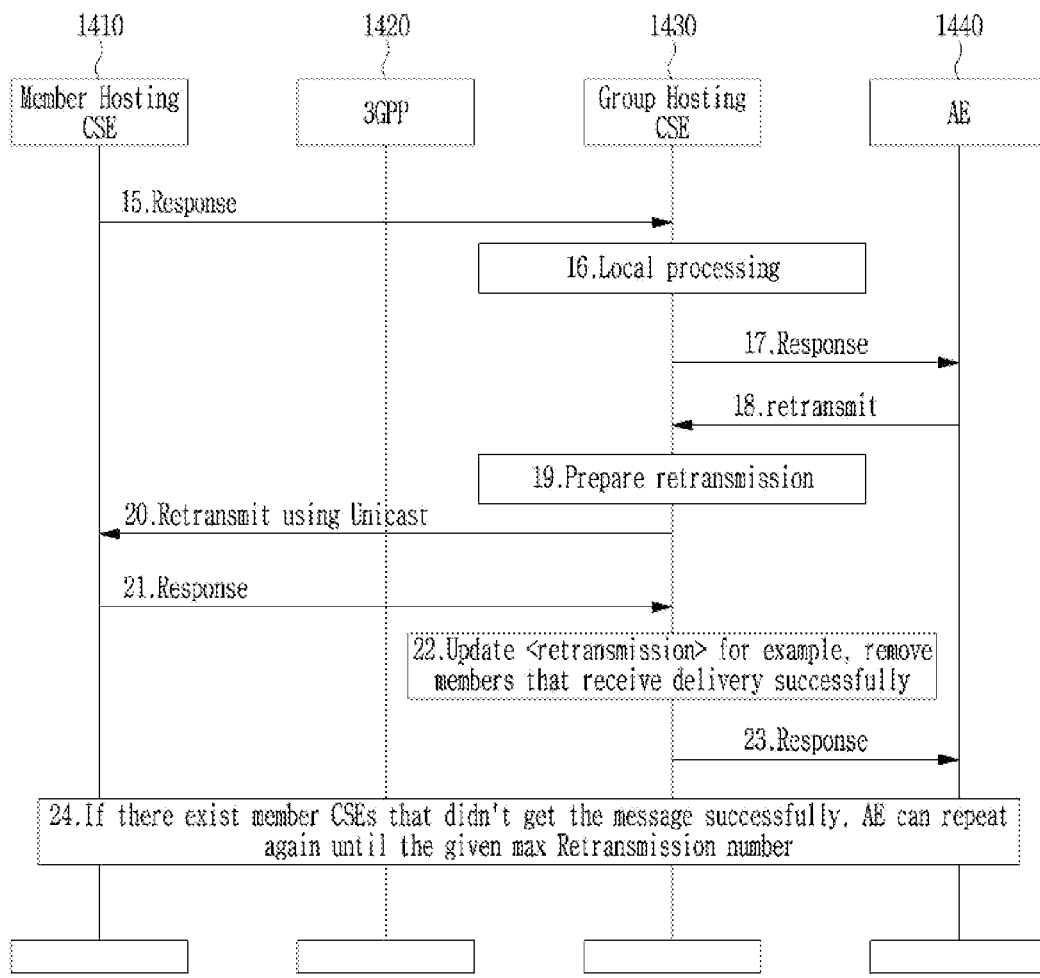

FIG. 11 to FIG. 14 illustrate an example of a process of implementing a message retransmission method according to an embodiment of the present invention. In particular, FIG. 11, FIG. 12 and FIG. 14 illustrate a message retransmission method that creates the MBMS group and uses the corresponding MBMS group. On the other hand, FIG. 13 illustrates a message retransmission method that does not use an MBMS group but uses a multicast mode.

FIG. 11 illustrates an example of a process of creating an MBMS group according to an embodiment of the present invention. Herein, MBMS service area information provided by an operator may be configured in an M2M system. In addition, in an M2M system, an external group identifier for an apparatus may be pre-provisioned.

First, an IN-AE 1150 transmits a <group> resource creation request to a group hosting CSE 1140. Next, the group hosting CSE 1140 checks whether or not a multicast capacity feature of a <remoteCSE> resource for two or more member hosting CSEs 1110 is composed of an MBMS value and has a same external group identifier (externalGroupID). Next, the group hosting CSE 1140 transmits a response to the IN-AE/CSE 1150.

Next, the group hosting CSE 1140 transmits a request of TMGI allocation to SCEF 1130. The request should include the following information that is specified in 3GPP TS 29.122 [5].

A HTTP POST method should be used.

URI should be set to {apiRoot}/3gpp-group-message-delivery-mb2/v1/{scsAsId}/tmgi-allocation. {apiRoot} and {scsAsId} segments are based on Service Provider and MNO policies.

The request payload should include a TMGIAllocation data structure as specified in 3GPP TS 29.122 [5] and should include the following attributes. In other words externalGroupID should be set to externalGroupID of the member hosting CSE 1110.

In addition, mbmsLocArea may be set as location information of the member hosting CSE 1110 according to an accuracy policy. In addition, supportedFeatures should set to a string value of '0' indicating that there is no support for notification through a website or a notification test event.

However, when a hosting CSE (that is, IN-CSE 1140) wants to transmit a TMGI allocation request, there may be a case in which SCEF is unreachable. In particular, the IN-CSE 1140 may not obtain a TMGI that is allocated in a basic 3GPP network. Accordingly, the IN-CSE 1140 may be incapable of using a multicast function for a corresponding group. In particular, the IN-CSE 1140 may process a request for group using a unicast function.

Next, a TMGI allocation request may be processed by the basic 3GPP network according to a procedure defined in 3GPP TS 23.682[2]. Herein, the SCEF 1130 transmits an allocation TMGI response to the group hosting CSE 1140. The response includes the following information that is specified in 3GPP TS 29.122 [5].

201 CREATED response code

URI of CPC (communication pattern configuration) subscription resource created in SCEF In HTTP Location header, the URI is returned in the form of {apiRoot}/3gpp-group-message-delivery-mb2/v1/{scsAsId}/tmgi-allocation/{tmgi}. {apiRoot} and {scsAsId} segments may be configured based on a service provider and an MNO policy. Herein, {tmgi} segment may be configured by SCEF.

The response payload may include a TMGIAllocation data structure as specified in 3GPP TS 29.122 [5] including an attribute existing in a request and may include the following additional attributes. In other words, it is possible to configure a link for {apiRoot}/3gpp-group-message-delivery-mb2/v1/{scsAsId}/tmgi-allocation/{tmgi} resource that is created by SCEF. Additionally, tmgi is configured by ID of a specific MBMS bearer service and tmgiExpiration is configured by an absolute time in which TMGI is considered to expire.

Next, the group hosting CSE 1140 stores tmgi and tmgiExpiration in local multicast group information and transmits a <localMulticastGroup> creation request to a member hosting CSE 1110 through unicast including a necessary attribute. In the case of multicast, the type is 3GPP_MBMS_group, and a request includes tmgi and responseTimeWindow.

FIG. 12 illustrates an example of a process of transmitting a group message by using the MBMS group that is generated through the above-described process of FIG. 11. First, effective TMGI allocation may be made through step S1 to step S4 of FIG. 12.

Next, an IN-AE/CSE 1250 transmits a request, which includes a group access identifier for access to a member resource, to a group hosting CSE 1240. For example, in the case of multicast, the type is 3GPP_MBMS_group, and the group hosting CSE 1240 checks an existing <schedule> resource, which is a child resource, for every member hosting CSE 1210 as a <node> resource. When there is no time intersection of an existing <schedule> resource, the group hosting CSE 1240 transmits an error response to the IN-AE/CSE 1250 after the process ends. On the other hand, when there is a time intersection, the group hosting CSE 1240 checks whether operation execution time and request expiration timestamp are within a range of intersection when the operation execution time or the request expiration timestamp is included in a request. Otherwise, the group hosting CSE 1240 transmits an error response to the IN-AE/CSE 1250 after the process ends.

Next, after activating an MBMS bearer by transmitting a group message delivery request to SCEF 1230, the group hosting CSE 1240 should provide an MBMS communication network resource for an MBMS member from a next start time of a time intersection. The request may include information that is specified in 3GPP TS 29.122 [5]. Next, an MBMS bearer activation process may be processed by the basic 3GPP network according to a procedure defined in 3GPP TS 23.682[2]. In addition, the SCEF 1230 transmits a group message response to the group hosting CSE 1240. The response may include information that is specified in 3GPP TS 29.122 [5].

Group message delivery by an MBMS procedure may be processed by the basic 3GPP network based on a procedure defined in 3GPP TS 23.682[2]. Next, the SCEF 1230 transmits group message delivery notification to the group hosting CSE 1240. The notification message may include information that is specified in 3GPP TS 29.122 [5].

Next, after receiving group message delivery notification, the group hosting CSE (IN-CSE) 1240 may transmit a response that has a specific response code (e.g., 204 NO CONTENT). Next, the member hosting CSE 1210 may be configured to transmit a response message within a response TimeWindow range. Herein, the group hosting CSE 1240 receives a response message from the member hosting CSE 1210 until ResponseTimeWindow expires and returns a collected group member response to an IN-AE/CSE 1250.

FIG. 13 illustrates an example of a message retransmission process according to an embodiment of the present invention. In particular, FIG. 13 relates to a message retransmission process using multicast.

When multicast message delivery fails, a group hosting CSE 1230 retransmits a message to a failed node through unicast. In other words, the group hosting CSE 1230 identifies a member, for which delivery fails, among members from memberNotDelivered attribute and transmits unicast message delivery to the member. When unicast delivery is successful, the group hosting CSE 1230 deletes memberNotDelivered. After a designated number of retransmissions, the group hosting CSE 1230 considers a failed node as not available anymore and removes a corresponding member from a <group> resource.

In addition, when there is still a failed node member that has not succeeded in receiving the retransmitted message, an AE 1250 may perform request repeatedly until a maximum number of retransmissions (maxNrOfRetransmission) is reached. On the other hand, when a given maximum number of retransmissions (maxNrOfRetransmission) runs out, the group hosting CSE 1230 may consider a failed node as not available anymore and remove a corresponding failed node member from a <group> resource. For example, the message retransmission process of FIG. 13 is implemented without applying MEMS group transmission by 3GPP 1320.

FIG. 14 illustrates an example of a message retransmission process according to an embodiment of the present invention. Especially, FIG. 14 relates to a message retransmission process using MBMS.

The present invention proposes a <Retransmission> resource to support multicast retransmission. When there is failure in multicast message delivery, the <Retransmission> resource is created as a sub-resource of a <group> resource. A group hosting CSE 1430 performs multicast for members 1510 listed in a <Retransmission> group for a given number of times. In the case of each retransmission, when a node successfully receives a message, the members may be removed from the <Retransmission> resource. In addition, after multicast is performed as many times as a given maximum number, the <Retransmission> may be removed. In particular, it is necessary to create and configure relevant information for performing 3GPP MBMS TMGI and 3GPP MBMS for a designated member in a <Retransmission> resource. The <Retransmission> resource may be a child resource of a <group> resource or a temporary independent resource. For example, in the case of the temporary independent resource, it is necessary to maintain a link with the original <group> resource.

Figure 17:
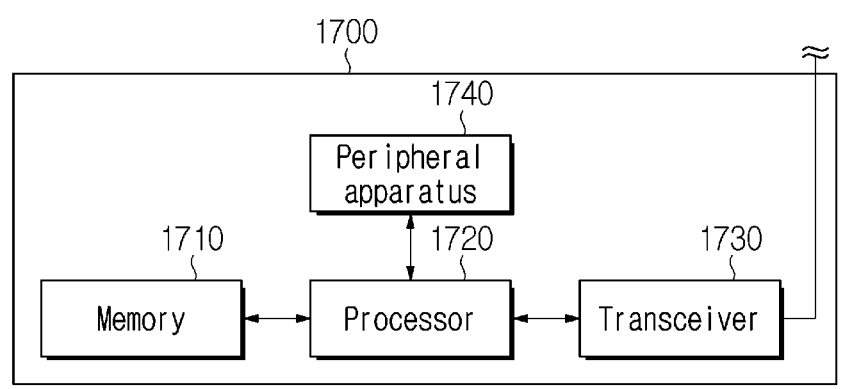
FIG. 17 is a view illustrating an example of an apparatus configuration according to the present invention.

FIG. 17 is a view illustrating an example of an apparatus configuration according to the present invention. Referring to FIG. 17, a device 1700 may include a memory 1710, a processor 1720, a transceiver 1730 and a peripheral apparatus 1740. In addition, for example, a device 1700 may further include another configuration and is not limited to the above-described embodiment. Herein, as an example, the device may be an apparatus operating based on the above-described M2M system. More specifically, the device 1700 of FIG. 17 may be an illustrative hardware/software architecture of an M2M network node such as an M2M device, an M2M gateway and an M2M server. In particular, for example, the memory 1710 may be a non-removable memory or a removable memory. In addition, for example, the peripheral apparatus 1740 may include a display, GPS or other peripherals and is not limited to the above-described embodiment. In addition, for example, the above-described device 1700 may be a node. Particularly, like the transceiver 1730, the node may include a communication circuit. Based on this, the node may perform communication with an external device.

In addition, as an example, the processor 1720 may be at least one of a general-purpose processor, a digital signal processor (DSP), a DSP core controller, a micro controller, application specific integrated circuits (ASICs), field programmable gate array (FPGA) circuits, any other type of integrated circuit (IC), and one or more microprocessors related to a state machine. In other words, it may be a hardware/software configuration playing a controlling role for operating the above-described device 1700. Particularly, the processor 1720 may be configured to execute computer-executable commands stored in the memory 1710 to implement various necessary functions of node. For example, the processor 1720 may be configured to execute at least any one operation among signal coding, data processing, power controlling, input and output processing, and communication. In addition, the processor 1720 may control a physical layer, an MAC layer and an application layer. In addition, for example, the processor 1720 may execute an authentication and security process in an access layer and/or an application layer, which is not limited to the above-described embodiment.

In addition, for example, the processor 1720 may be configured to perform communication with other devices through the transceiver 1730. For example, the processor 1720 may be configured to execute computer-executable commands so that a node can be controlled to perform communication with other nodes through a network. In other words, communication performed in the present invention may be controlled. As an example, other nodes may be an M2M gateway, an M2M server and other devices. For example, the transceiver 1730 may be configured to transmit a RF signal through an antenna. It may transmit a signal based on various communication networks. In addition, as an example, MIMO technology and beam forming technology may be applied as antenna technology but are not limited to the above-described embodiment. In addition, a signal transmitted and received through the transceiver 1730 may be operated by the processor 1720 by being modulated and demodulated, which is not limited to the above-described embodiment.

Figure 18:
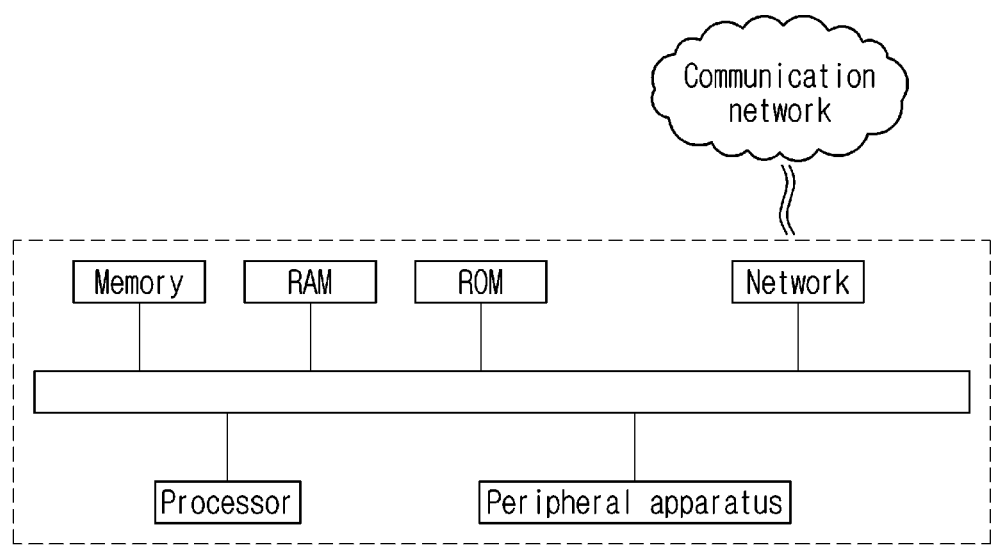
FIG. 18 is a view illustrating another example of an apparatus configuration according to the present invention.

FIG. 18 may be another apparatus configuration for a device. Referring to FIG. 18, as described above, it may be controlled by a processor. Herein, as an example, a memory, RAM, ROM and a network may be included. In addition, another movable memory may be further included and is not limited to the above-described embodiment. Herein, the processor may be controlled to execute a command based on information stored in the above-described memories and to perform the operations described in the present invention. In addition, the processor may be provided with power by a power supply and be offered input information by peripherals, which is not limited to the above-described embodiment. In addition, as an example, a device may obtain location information and related information based on GPS and the like. In addition, as an example, a device may receive input information based on other input devices and is not limited to the above-described embodiment.

The above-described exemplary embodiments of the present invention may be implemented by various means. For example, the embodiments of the present invention may be implemented by hardware, firmware, software, or a combination thereof.

The foregoing description of the preferred embodiments of the present invention has been presented for those skilled in the art to implement and perform the invention. While the foregoing description has been presented with reference to the preferred embodiments of the present invention, it will be apparent to those skilled in the art that various modifications and variations can be made in the present invention without departing from the spirit or scope of the present invention as defined by the following claims. Accordingly, the present invention is not intended to be limited to the embodiments shown herein but is to be accorded the widest scope consistent with the principles and novel features disclosed herein.

In addition, while the preferred embodiments of the present specification have been particularly shown and described, it is to be understood that the present specification is not limited to the above-described embodiments, but, on the contrary, it will be understood by those skilled in the art that various changes and modifications may be made without departing from the spirit and scope of the present specification as defined by the claims below, and such changes and modifications should not be individually understood from the technical thought and outlook of the present specification.

In this specification, both the invention and the method invention are explained, and the description of both inventions may be supplemented as necessary. In addition, the present invention has been described with reference to preferred embodiments thereof. It will be understood by those skilled in the art that various changes in form and details may be made therein without departing from the essential characteristics of the present invention. Therefore, the disclosed embodiments should be considered in an illustrative rather than a restrictive sense. The scope of the present invention is defined by the appended claims rather than by the foregoing description, and all differences within the scope of equivalents thereof should be construed as being included in the present invention.

The present invention may be applied not only to a oneM2M system but also to various systems.

The invention claimed is:

1. A message repetition transmission method for operating a first device in a machine-to-machine (M2M) system, the method comprising:
   receiving, by the first device from an application entity, a request message comprising attribute information for requesting message repetition transmission, wherein the attribute information includes:

an attribute targetResource designating a target resource including at least one value to be repeatably transmitted by the message repetition transmission, and an attribute valueForRepetition designating the at least one value to be repeatably transmitted by the message repetition transmission;

creating, by the first device a first resource that includes the attribute information and is applied to the message repetition transmission;

transmitting, to the application entity, a response message for informing of successful creation of the first resource; and performing, by the first device, the message repetition transmission to a group of users based on the attribute information of the first resource;

wherein the message repetition transmission comprises a plurality of transmissions of the at least one value designated by the attribute valueForRepetition included in the target resource to provide the group of users with the at least one value.

2. The message repetition transmission method of claim 1, wherein the attribute information further includes attribute repetitionOriginator that designates an originator requesting the message repetition transmission, and wherein the originator is the application entity.

3. The message repetition transmission method of claim 1, wherein the attribute information further includes attribute targetOperation that designates a CREATE operation or an UPDATE operation as an operation method of the message repetition transmission.

4. The message repetition transmission method of claim 1, wherein the attribute information further includes attribute nextForcedvalue designating a value that is applied to next message repetition transmission.

5. The message repetition transmission method of claim 4, wherein, when the attribute nextForcedvalue is updated in the first resource, the next message repetition transmission is performed with a value designated by the attribute nextForcedvalue instead of a transmission value designated by the attribute valueForRepetition.

6. The message repetition transmission method of claim 1, wherein the attribute information further includes attribute intervalRep designating an interval at which the message repetition transmission is performed.

7. The message repetition transmission method of claim 1, wherein the attribute information further includes attribute repetitionDuration designating a number of times that the message repetition transmission is performed.

8. The message repetition transmission method of claim 1, wherein the attribute information further includes an attribute responseMode that designates one of only once, every N minutes, or accumulated response as a method of receiving a response message.

9. The message repetition transmission method of claim 1, wherein the first resource is a repeated creation resource msgRepetition.

10. The message repetition transmission method of claim 1, wherein the first resource further includes a schedule resource.

11. The message repetition transmission method of claim 1, wherein the first resource belongs to a message repetition transmission list resource msgRepetitionList.

12. The message repetition transmission method of claim 1, further comprising:
receiving, from another application entity, a subscription request message for the target resource;
creating another value in the first resource; and
transmitting, to the another application entity, a notification message for notifying of creation of the another value.

13. The message repetition transmission method of claim 5, further comprising:
receiving, from the application entity, an update message for requesting to update the attribute nextForcedvalue with another value;
updating the attribute nextForcedvalue with the another value; and
performing the message repetition transmission for repeatably transmitting the another value.

14. The message repetition transmission method of claim 1, wherein the group of users comprises users using Multimedia Broadcast Multicast Service (MBMS), users being in a traffic communication area or users being in a danger warning area.

15. The message repetition transmission method of claim 14, wherein the first device is a common service entity.

16. A message retransmission method for operating a first device in a machine-to-machine (M2M) system, the method comprising:
creating, by the first device, a first resource that includes attribute information for the message retransmission and is applied to the message retransmission, wherein the attribute information includes:
an attribute memberNotDelivered designating at least one first user to which a message is not delivered, and
an attribute membersNotRead designating at least one second user which has received the message and not read the message;
identifying, by the first device based on the attribute memberNotDelivered and the attribute membersNotRead, at least one third user which newly joined a group and has not received the message; and
performing, by the first device the message retransmission to the at least one third user based on the first resource.

17. The message retransmission method of claim 16 comprising:
determining whether there is a failed node that fails to receive multicast transmission; and
repeatedly performing retransmission for the failed node based on attribute maxNrOfRetransmission of the first resource,
wherein the attribute maxNrOfRetransmission designates a maximum number of retransmission.

18. The message retransmission method of claim 16, wherein the attribute information further includes an attribute retransmissionMode designating a unicast transmission mode or a Multimedia Broadcast Multicast Service (MBMS) transmission mode as a retransmission mode, and
wherein performing message retransmission to the at least one third user comprises:
selecting the unicast transmission mode or the MBMS transmission mode as the retransmission mode for message retransmission based on the attribute retransmissionMode; and
performing, based on the selected retransmission mode, the message retransmission to the at least one third user.

19. A message repetition transmission apparatus in a machine-to-machine (M2M) system, the apparatus comprising:
- at least one or more processors; and
- at least one or more memories coupled to the at least one or more processors,
- wherein the at least one or more processors, which are operably coupled to the at least one or more memories and execute a program instruction stored in the at least one or more memories to:
  - receive, from an application entity, a request message comprising attribute information for requesting message repetition transmission, wherein the attribute information includes:
    - an attribute targetResource designating a target resource including at least one value to be repeatably transmitted by the message repetition transmission; and
    - an attribute valueForRepetition designating the at least one value to be repeatably transmitted by the message repetition transmission;
  - create a first resource that includes the attribute information for the message repetition transmission and is applied to the message repetition transmission;
  - transmit, to the application entity, a response message for informing of successful creation of the first resource, and
  - perform the message repetition transmission to a group of users based on the attribute information of the first resource;
- wherein the message repetition transmission comprises a plurality of transmissions of the at least one value designated by the attribute valueForRepetition included in the target resource to provide the group of users with the at least one value.

* * * * *